(12) United States Patent
Veugen

(10) Patent No.: US 10,102,399 B2
(45) Date of Patent: Oct. 16, 2018

(54) SECURE EVALUATION OF A PROGRAM

(71) Applicants: Koninklijke KPN N.V., Rotterdam (NL); Nederlandse Organisatie voor Toegepast-Natuurwetenschappelijk Onderzoek TNO, Delft (NL)

(72) Inventor: Peter Joannes Mathias Veugen, Voorburg (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 1042 days.

(21) Appl. No.: 14/497,606

(22) Filed: Sep. 26, 2014

(65) Prior Publication Data
US 2015/0089243 A1    Mar. 26, 2015

(30) Foreign Application Priority Data
Sep. 26, 2013    (EP) .................................... 13186211

(51) Int. Cl.
*G06F 11/30* (2006.01)
*G06F 21/72* (2013.01)
*H04L 9/00* (2006.01)

(52) U.S. Cl.
CPC ............ *G06F 21/72* (2013.01); *H04L 9/008* (2013.01); *H04L 2209/46* (2013.01); *H04L 2209/88* (2013.01)

(58) Field of Classification Search
CPC ..... G06F 11/3624; G06F 21/72; G06Q 10/06; H04L 2209/46; H04L 2209/88; H04L 9/008
See application file for complete search history.

(56) References Cited

PUBLICATIONS

Mauro Barn! et al: "Secure Evaluation of Private Linear Branching Programs with Medical Applications", International Association for Cryptologic Research vol. 20090629:121437, Jun. 29, 2009 (Jun. 29, 2009), pp. 1-20, XP061003474.*

(Continued)

*Primary Examiner* — Abiy Getachew
(74) *Attorney, Agent, or Firm* — Hamilton, Brook, Smith & Reynolds, P.C.

(57) ABSTRACT

A method for enabling a client in a user device to securely evaluate a linear branching program. The program may include decision nodes and end-labels. A decision node is associated with a comparison computation for comparing a first value with a second value and a decision rule that links the outcome of the comparison computation to a further decision node or end-label. The method includes transforming the comparison computation into encrypted evaluation sequences on the basis of an additive homomorphic cryptosystem. An evaluation sequence of a decision node includes a sequence of numbers in which the outcome of a comparison computation at a node is embedded; and, evaluating evaluation sequences, evaluating including detecting presence of a predetermine value in an evaluation sequence of a node and determining an evaluation sequence of a further node or an end-label on the basis of the detection of the predetermined value.

16 Claims, 9 Drawing Sheets

| decision node | calc | decision table + pointer |
|---|---|---|
| $N_1$ (root) | $3 \geq 2$ | true -> $N_3$ ; false -> $N_2$ |
| $N_2$ | $4 \geq 2$ | true -> $N_5$ ; false -> $N_4$ |
| $N_3$ | $2 \geq 1$ | true -> $N_7$ ; false -> $N_6$ |
| $N_7$ | $2 < 1$ | true -> $L_8$ ; false -> $L_7$ |

$V_i = (3, 4, 2, \ldots, 2)$ 116    114

(56) References Cited

PUBLICATIONS

Zekeriya Erkin et al: "Privacy enhanced recommender systems", Thirty-First Symposium on Information Theory in the Benelux, May 11-12, 2010,Rotierdam, Nederland, , May 11, 2010(May 11, 2010), pp. 35-42, XP002689083, Retrieved from the Internet: URL:http://prlab.tudelft.nl/sites/default/files/EBVL 1 Oa.pdf.*

Barni, M., et al., "Secure Evaluation of Private Linear Branching Programs with Medical Applications," International Association for Cryptologic Research, vol. 20090629: 121437, pp. 1-20 (Jun. 29, 2009).

Erkin, Z., et al., "Privacy Enhanced Recommender System," Thirty-First Symposium on Information Theory in the Benelux, pp. 35-42, (May 11, 2010).

Erkin, Z., et al., "Privacy-Preserving User Clustering in a Social Network," Information Forensics and Security, 2009. WIFS 2009, First IEEE International Workshop on, IEEE, pp. 96-100, (Dec. 6, 2009).

Ishai, Y., and Paskin, A., "Evaluating Branching Programs on Encrypted Data," Theory of Cryptograph; [Lecture Notes in Computer Science; LNCS], pp. 575-594, (Feb. 21, 2007).

Barni, M., "Privacy-Preserving ECG Classification with Branching Programs and Neural Networks," IEEE Transactions on Information Forensics and Security, vol. 6, No. 2, pp. 452-468, (Jun. 2011).

European Search Report of EP 13 18 6211, dated Mar. 18, 2014.

* cited by examiner

SECURE EVALUATION OF A PROGRAM

RELATED APPLICATION

This application claims priority under 35 U.S.C. § 119 or 365 to European Application No. EP 13186211.2, filed 26 Sep. 2013. The entire teachings of the above application are incorporated herein by reference.

TECHNICAL FIELD

The invention relates to secure evaluation of a program, and, in particular, though not exclusively, to a software-implemented method for secure evaluation of a linear branching program and a secure computing system for evaluating a linear branching program, a client and server for use in such system and a computer program product for using such method.

BACKGROUND

The cloud computing model provides users an ubiquitous, convenient and on-demand network access to a shared pool of configurable computing resources (e.g., networks, servers, storage, applications, and services), that can be rapidly provisioned and released with minimal management effort or service-provider interaction. Cloud computing enables cloud services such as Computing as a Service wherein not only data storage but also computing is outsourced to the cloud. While from a business point of view cloud computing offers a lot of advantages, the non-transparent nature of the cloud may negatively affect the trust that users put in such systems wherein in this case users are not only users that consume the cloud services but also providers that want to exploit their products via the cloud.

For example, a software provider may want to exploit a program that comprises commercially sensitive information via the cloud. The commercially sensitive information may be implemented in a program as one or more values that are used in the processing of user input data. For example, an output of a program may be the result of a computation, e.g. a comparison, between commercially sensitive program data and privacy sensitive user input (e.g. financial, commercial, or medical data, passwords and/or biometric data or sensor data such as images of surveillance camera or data associated with a production process).

The output of the software program may be a result of one computation or several (different) computations. In the latter case, the output of a program may be represented as the result of the evaluation of a decision tree, which is evaluated in a linear way by going from the root of the tree downwards to one of the leaves. In each node a decision has to be made which path is taken to get closer to the leaves, (e.g. the end-points or end-labels), wherein the decision is the outcome of one or more computations, in particular a comparison between two values, and wherein each leaf represents a possible output of the program. A program that can be executed this way may be referred to as a linear branching program.

Linear branching programs may be found in simple software programs such as an Internet application or in more complex software programs including expert systems such as a medical or financial expert system. A medical expert system may determine the disease or fitness of a user on the basis of the personal medical data. Similarly, a financial expert system may assist a user in choosing the proper mortgage on the basis personal financial information of the user. Another application may be software fault diagnosis. A proper algorithm explaining the actual problem to the user on the basis of his personal error reports and giving him some advice may be commercially valuable.

In the above mentioned software programs, the sensitive program parameters may be considered as a valuable part or in some cases the most valuable part of the program, because these parameters are constructed on the basis of dedicated field expertise and/or numerous test runs. Outsourcing (part of) the storage and execution of such software program to a third party may expose commercially sensitive information to a third party. Similarly, when requesting execution of an outsourced program (e.g. a cloud application), a user may be required to send privacy sensitive user data to the cloud server thereby providing the cloud provider access to privacy sensitive information (or at least increasing the risk that privacy sensitive information can be accessed by third parties such as the cloud operator). For this reason, a software provider may be reluctant to outsource storage and execution of the program to the cloud. Similarly, a user may be reluctant to provide personal data to a program that is executed in the cloud. These security and privacy issues may seriously impede users and software providers to use cloud solutions and thereby blocking large-scale commercial applications of the cloud.

Barni et al. propose in their article "Privacy-Preserving ECG Classification With Branching Programs and Neural Networks", IEEE transactions on information forensics and security, vol. 6, no. 2, 2011, a protocol between a server and a client wherein the server holds a linear branching program and the client holds user data. The protocol allows evaluation of a linear branching program on the basis of user data without disclosing the user data to the server and without disclosing the linear branching program to the (user of the) client. For each node a Garbled Circuit (GC) is made. The GCs are all communicated to the client for secure evaluation. This way, the user will not learn which attribute is compared with which threshold, and the server will not learn the value of the user attribute. At the end of the evaluation, the user may obtain an output representing in this particular case an ECG classification.

The protocol proposed by Barni et al. is designed for a two-party situation, i.e. a server and a client. This protocol cannot be straightforwardly extended to a three-party situation wherein the owner of a computer program outsources the exploitation of the program (e.g. storage and execution) to a third party without losing its security and privacy protecting properties.

The evaluation of the nodes by the user using Garbled Circuits requires a relatively large amount of traffic between the user and server and a relatively large processing power at the client side: in the scheme a final circuit calculates the classification on the basis of the outputs of all nodes, i.e. also the nodes that do not lie on the evaluation path from the root to the leaf. Hence, for the evaluation of large programs a large amount of processing power is required thereby not providing a solution that is scalable.

A further problem with the protocol proposed by Barni et al. is that the program is only computationally secure towards the user. Garbled circuits are used for secure evaluation of one pass linear circuits consisting of a number of Boolean gates, which are elementary operations on bits. Each gate is securely translated into a table where inputs and outputs are represented by keys, and the output keys are encrypted with input keys to assure that only one output (corresponding with the proper input values) can be obtained.

When sufficient computational power is available, such encryption scheme could be broken by a brute force attack. The output keys of each gate could be determined and the program would be revealed to the user, including the sensitive program parameters. The use of encryption during evaluation limits the security to computational security instead of the maximum achievable security, which is known as perfect security. In perfect security the user would never learn the sensitive program parameters even with infinite computing power.

Hence, there is a need in the art for improved methods and systems that enable secure computation of privacy sensitive user data by a software program. In particular, there is a need in the art for methods and systems that enable for secure computation of privacy sensitive user data by a software program wherein the storage and exploitation of the program is outsourced to a party that does not own the program.

SUMMARY

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. In an aspect the invention may relate to a computer-implemented method for securely evaluating at least part of a linear branching program, wherein said program may have a binary decision tree structure comprising one or more (indexed) decision nodes and two or more (indexed) end-label nodes. In an embodiment, a decision node may be associated with a comparison operation between a user attribute and a threshold value The comparison is executed in the encrypted domain, meaning being performed on an encrypted user attribute and an encrypted threshold value. The encryption of the user attribute and the threshold value is based on a, preferably additive, homomorphic cryptosystem.

In an embodiment, said method may comprise: a (micro)processor, preferably in a secure server, executing computer readable program code for transforming at least part of the comparison operations associated with said one or more decision node into one or more encrypted evaluation sequences on the basis of an first additive homomorphic cryptosystem, preferably the Damgard, Geisler, Kroigaard (DGK) cryptosystem, wherein an evaluation sequence of a decision node comprises a sequence of numbers in which the outcome of the comparison operation of a decision node is embedded.

In another embodiment, said method may further comprise: a (micro)processor, preferably in a user device, executing computer readable program code for evaluating said one or more evaluation sequences, said evaluating including detecting the presence of a predetermined number, preferably a zero, in a first evaluation sequence of a first node and determining a second decision node for evaluation, preferably of a second evaluation sequence, or determining an index of an end-label on the basis of the detection of said predetermined number.

The comparisons for each node may be computed in the encrypted domain using homomorphic computations (e.g. additions) wherein the, preferably binary, result (e.g. outcome) of a comparison (e.g. true or false) is embedded in an evaluation sequence comprising a number of encrypted values, wherein said outcome (result) of the comparison is (securely) embedded in the sequences of values. The sequences of values associated with the nodes of the binary branching program may thus be regarded as a secure and personalized version of the linear branching program, which may evaluated.

For each input set (of one or more user attributes), a fresh secure version of the program is created by the network application, which may be evaluated by an user device. Hence, each time a new user input is provided to the secure server, a new version of the program is generated. This way, the network application may control the number of executions of the linear branching program by a user device.

The one or more encrypted evaluation sequences are provided by the secure server to a user device performing the evaluation. In embodiments the providing may relate to transmitting these data over a wireline or wireless transmission medium. However other ways of providing could be via the exchange of a non-transitory medium (e.g. a USB stick). In an embodiment wherein the secure server is a third party secure module, embedded in the user device, the providing could relate to handing over these data from the third party secure module over an internal interface of the user device.

As the sequences of values comprise no information regarding the thresholds and/or user attributes, the program may be evaluated by a (microprocessor inside the) user device without any interaction with the network application (e.g. the computer readable program code executed by the secure server) and without the risk of leaking information of the thresholds to the user. In contrast with evaluation systems that are based on Garbled Circuits, the secure system according to the invention provides perfect security even in case the distribution and execution of the program is outsourced to a secure (third-party) server. The commercially sensitive part of the program, such as the value and meaning of the thresholds, and thus the tree structure itself, will remain unknown to both the (the owner of the) secure server and the users of the user devices.

The evaluation sequences may be evaluated using a (simple) rule, e.g. the presence of a zero (or some other predetermined number) in a sequence or not. The evaluating may be performed in the encrypted domain (e.g. the evaluation sequence remains encrypted). Alternatively the step of evaluating the evaluation sequence comprises a step of partly decrypted or fully decrypted to plaintext, before detecting the predetermined number (e.g. the zero). Whether such decryption step is needed, is implementation dependent. For example when the DGK comparison protocol is used, the evaluating of an encrypted value of an encrypted evaluation sequence may simply be to check if the condition that a DGK-encrypted value $[[c_{ji}]]$ contains a zero exactly when $[[c_{ji}]]^v = 1 \mod N$, where v is a 160-bit DGK parameter, is fulfilled or not. In this manner no decryption of the encrypted evaluation sequence to plain text is needed.

The outcome of a first evaluation of a first evaluation sequence associated with a first node (e.g. the root) may be used to select a second evaluation sequence associated with a second node. This process may be repeated until an end-label is reached. Hence, in contrast with other schemes such as the use of Garbled Circuits, the client only needs to evaluate the (decision) nodes on the path that lead to the end-label. Hence, the evaluation process is very efficient in terms of processing power. During evaluation, the client only learns a random path through a binary tree. For each evaluation, a new set of evaluation sequences is created so that it is not possible to for the client to correlate sets of evaluation sequences associated with different user inputs.

In an embodiment, the method may comprise a receiver of said secure server receiving one or more encrypted user attributes from a user device.

In an embodiment the user device providing the encrypted user attributes is the same user device that performs the evaluation of the evaluating sequence. However, in other embodiments these devices may be different. For instance the user device providing the encrypted user attributes may be a monitoring device, for example a hardware based sensor, whereas the second user device performing the evaluation is a personal computing device (e.g. a tablet, smartphone, laptop and so on). The user device may also simply relate to a device that is able to encrypt user attributes according to the invention (and optionally decrypt and bitwise re-encrypt encrypted blinded node values according to the invention), wherein the user attributes may be manually inserted by a user or provided otherwise to the device.

In another embodiment, a receiver of said secure server receiving one or more encrypted threshold values, one or more node indices; and/or, one or more node comparison parameters from a software delivery server, wherein a node index is configured to link an user attribute to a threshold value for the decision node and wherein a node comparison parameter indicates the type of comparison operation of a node and wherein user attributes and said threshold values are encrypted using a second additive homomorphic cryptosystem, preferably the Pallier cryptosystem.

Hence, commercially sensitive information of a linear branching program and the privacy sensitive information that is needed to evaluate the linear branching program, may be separately provided in encrypted form to a the secure server that is configured to compare the threshold and input values for at least part of the decision nodes of the program in the encrypted domain. The invention provides thus provides a secure multi-party computing system wherein the storage and evaluation (execution) of the program is outsourced to a party that does not own the program and wherein during storage and evaluation privacy sensitive user data are not disclosed to the network provider and the software provider and commercially sensitive parts of the program are not disclosed to the user device.

In an embodiment, said (micro)processor in said secure server further executing computer readable program code for forming one or more encrypted comparison operations by combining one or more user attributes and one or more threshold values in the encrypted domain using one or more homomorphic computations.

In an embodiment said secure server relates to a hardware security module (HSM) such as a plug-in card or an external device that attaches directly to a computer or network server.

In a further embodiment said secure server relates to a secure module for example in the form of a System on Chip (SoC). In yet further implementations it relates to the combination of hardware circuitry, memory, and microprocessor, and the necessary computer readable program code for embodying the invention as claimed. The secure server may in certain embodiments be implemented in a user device or directly attached to it. The main characteristic of the secure server is that non-authorized users don't have access to it. Hence the data inside is inaccessible for unauthorized users. Preferably the person authorized to use the user device is different from the person authorized to access the secure server.

In an embodiment, said computer readable program code for transforming at least part of said comparison operations further comprises: linking an encrypted user attribute $[v_j]$ to a node index $\alpha_j$ in order to form an indexed encrypted user attribute; combining the indexed encrypted user attribute $[v_{\alpha j}]$ with its associated encrypted threshold value $[t_j]$ and a random blinding value $[b_j]$ into an encrypted blinded node value $[v_{\alpha j}-t_j+b_j]$ on the basis of one or more homomorphic computations. In this embodiment, node indices may be used to link encrypted sensitive program information to (privacy sensitive) user attributes. Further, the encrypted information may be blinded on the basis of a (preferably large) random number. This ensures that when the encrypted blinded node value is decrypted, no information can be derived from it.

In an embodiment, said computer readable program code for transforming at least part of said comparison operations further comprises: comparing said blinded node value $v_{\alpha j}-t_j+b_j$ with a blinding value $b_j$ in the encrypted domain; and/or, embedding the (preferably binary) outcome of said comparison in an evaluation sequence. In this embodiment, comparison operations on the basis of blinded node values are performed by comparing the blinded node value with the blinding value in the encrypted domain.

In a further embodiment comparing said encrypted blinded node value with a blinding value in the encrypted domain may include: decrypting said encrypted blinded node value $[v_{\alpha j}-t_j+b_j]$ in a blinded node value; determining a bitwise encrypted blinded node value $[[v_{\alpha j}-t_j+b_j]]_B$ and a bitwise encrypted blinding value $[[b_j]]_B$ on the basis of said first additive homomorphic cryptosystem, preferably the DGK cryptosystem. Thus the blinded node value may be re-encrypted by a user device, subsequently provided to the secure server, and thereafter used together with an encrypted version of the blinding value in the comparison operation.

In an embodiment said encrypted blinded node value is provided by the secure server to the (user) device that provided the encrypted user attributes.

In an embodiment, comparing said encrypted blinded node value with a blinding value in the encrypted domain may include: using the DGK comparison protocol for comparing said bitwise encrypted blinded node value $[[v_{\alpha j}-t_j+b_j]]_B$ and said bitwise encrypted blinding value $[[b_j]]_B$ and for generating an evaluation sequence that is associated with said comparison. The DGK comparison protocol provides a very efficient way of comparing two values in the encrypted domain.

In a further embodiment, said transforming includes multiplicatively blinding the numbers $(c_i)$ of said encrypted evaluation sequence. This multiplicative blinding (in the encrypted domain) of the $c_i$ ensures that no information about d or r is leaked towards the client (i.e. the module or device to which the user has access), irrespective of his computing power, achieving perfect security of the branching program.

In an embodiment, executing computer readable program code for evaluating said one or more evaluation sequences may further comprise: using a decision rule for selecting a further decision node of said program on the basis of the outcome of said comparison operation; finishing said evaluation when an end-label, preferably an index of an end-label, is determined.

In an embodiment, said method may further comprise if an index of an end-label is determined, said user device requesting said end-label from a software provisioning server or said secure server.

In an embodiment said one or more user attributes may be associated with classification values $y_i$. In an embodiment, said classification values may be part of a classification vector $y=B f^c$, wherein the matrix B comprises the commercially sensitive knowledge obtained through a set of training ECGs and wherein $f^c$ represents a composite feature vector. In an embodiment, said user attributes may be associated with one or more sensor parameters, preferably image parameters or parameters associated with measured physical property of an object or system, that are obtained from a sensor in a user device.

Applications may include medical applications wherein a medical sensor device that is configured to measure and process medical data of a patient, e.g. an ECG scan or a blood pressure value, and wherein the medial data are evaluated by a linear branching program that is hosted in the cloud. Further applications include image processing applications, wherein image-processing device (e.g. a surveillance camera, a fingerprint capturing device or an iris-scanning device) is configured to capture and process image data that are further evaluated by a linear branching program in the cloud.

Further application may include Machine-to-Machine and/or Internet-of-Things applications wherein privacy sensitive sensor parameters are evaluated by a linear branching program that is hosted in the cloud. The sensor parameters may be obtained by smart sensors that are installed at home and the evaluation of the measured sensor parameters by the program may be used to analyse the use of certain apparatuses by the user.

In a further aspect, the invention relates to a secure server configured for enabling secure evaluation of a linear branching program, said program having a binary decision tree structure comprising one or more decision nodes and two or more end-labels, wherein a decision node is associated with a comparison operation between a user attribute and a threshold value, wherein the server may comprise: a computer readable storage medium having computer readable program code embodied therewith, and a (micro)processor coupled to the computer readable storage medium, wherein responsive to executing the first computer readable program code, the (micro)processor is configured to perform executable operations comprising:

transforming at least part of the comparison operations associated with said one or more decision nodes into one or more encrypted evaluation sequences on the basis of an additive homomorphic cryptosystem, wherein an evaluation sequence of a decision node comprises a sequence of numbers in which the outcome of the comparison operation of a node is embedded.

The secure server may further have a transmitter for transmitting these one or more encrypted evaluation sequences to a user device, and/or for transmitting one or more encrypted blinded node values to a user device.

The secure server may also have a first receiver for receiving one or more encrypted threshold values and/or one or more encrypted user attributes and/or one or more bitwise encrypted blinded node values.

In yet another aspect, the invention may relate to a user device for enabling secure evaluation of a linear branching program, said program having a binary decision tree structure comprising one or more decision nodes and two or more end-labels, wherein a decision node is associated with a comparison operation between a user attribute and a threshold value, said the user device may comprise: a computer readable storage medium having at least part of a transformed linear branching program embodied therewith, wherein at least part of the comparison operations associated with said one or more decision nodes of said stored linear branching program are transformed into one or more encrypted evaluation sequences on the basis of an additive homomorphic cryptosystem, wherein an evaluation sequence of a decision node comprises a sequence of numbers in which the outcome of the comparison operation of a node is embedded; and, a computer readable storage medium having computer readable program code embodied therewith, and a microprocessor coupled to the computer readable storage medium, wherein responsive to executing the computer readable program code, the processor is configured to perform executable operations comprising:

evaluating said one or more evaluation sequences, said evaluating including detecting the presence of a predetermine number in a first evaluation sequence of a first node and determining a second evaluation sequence of a second node or an end-label on the basis the detection of said predetermined number.

In a further aspect the invention may relate to a device, preferably a hardware based sensor comprising a computer readable storage medium having computer readable program code embodied therewith, and a processor, preferably a microprocessor, coupled to the computer readable storage medium, wherein responsive to executing the computer readable program code, the processor is configured to perform one or more of the following executable operations:

Providing, preferably via a transmitter at said device, one or more encrypted user attributes $[v_j]$ to a secure server, said user attributes being encrypted by said device on the basis of an additive homomorphic cryptosystem, preferably the Pallier cryposystem; said one or more encrypted user attributes $[v_j]$ being linked by said secure server to a node index $\alpha_j$ in order to form an indexed encrypted user attribute; and said indexed encrypted user attribute $[v_{\alpha j}]$ being combined with an associated encrypted threshold value $[t_j]$ and a random blinding value $[b_j]$ into an encrypted blinded node value $[v_{\alpha j}-t_j+b_j]$ on the basis of one or more homomorphic computations on the basis of said homomorphic cryptosystem;

Receiving from said secure server via a receiver at said device said encrypted blinded node value $[v_{\alpha j}-t_j+b_j]$, Decrypting said encrypted blinded node value $[v_{\alpha j}-t_j+b_j]$ into a blinded node value;

In embodiments of the invention, the executable operations further include

Determining of a bitwise encrypted blinded node value $[[v_{\alpha j}-t_j+b_j]]_B$ on the basis of a further additive homomorphic cryptosystem, preferably the DGK system, and said blinded node value.

Providing, preferably via a transmitter at said device, said bitwise encrypted blinded node value $[[v_{\alpha j}-t_j+b_j]]_B$ to said secure server.

In other embodiments of the invention, the blinded node value is provided (e.g. transmitted) to a further user device, namely the user device configured for evaluating one or more encrypted evaluation sequence according to the invention. In these embodiments the executable determining operation above and the subsequent executable providing operation above, are left to said further user device. This may have the benefits that the hardware based sensor (e.g. the monitoring device) need not have the evaluating functionality according to the invention, which may be left to a user device. And furthermore the device need not have the capabilities of the further additive homomorphic cryptosystem, since the bitwise re-encryption (e.g. the determining operation) is left to the further user device.

In yet another aspect, the invention may relate to a computer program product for enabling secure evaluation of a linear branching program, said program having a binary decision tree structure comprising one or more decision nodes and two or more end-labels, wherein a decision node is associated with a comparison operation between a user attribute and a threshold value, the computer program product comprising: a computer readable storage medium having computer readable program code embodied therewith, wherein the computer readable program code may comprise: transforming at least part of the comparison operations associated with said one or more decision nodes into one or more encrypted evaluation sequences on the basis of an additive homomorphic cryptosystem, wherein an evaluation sequence of a decision node comprises a sequence of numbers in which the outcome of the comparison operation of a node is embedded.

The invention will be further illustrated with reference to the attached drawings, which schematically will show embodiments according to the invention. It will be understood that the invention is not in any way restricted to these specific embodiments.

DETAILED DESCRIPTION

Figure 1A:
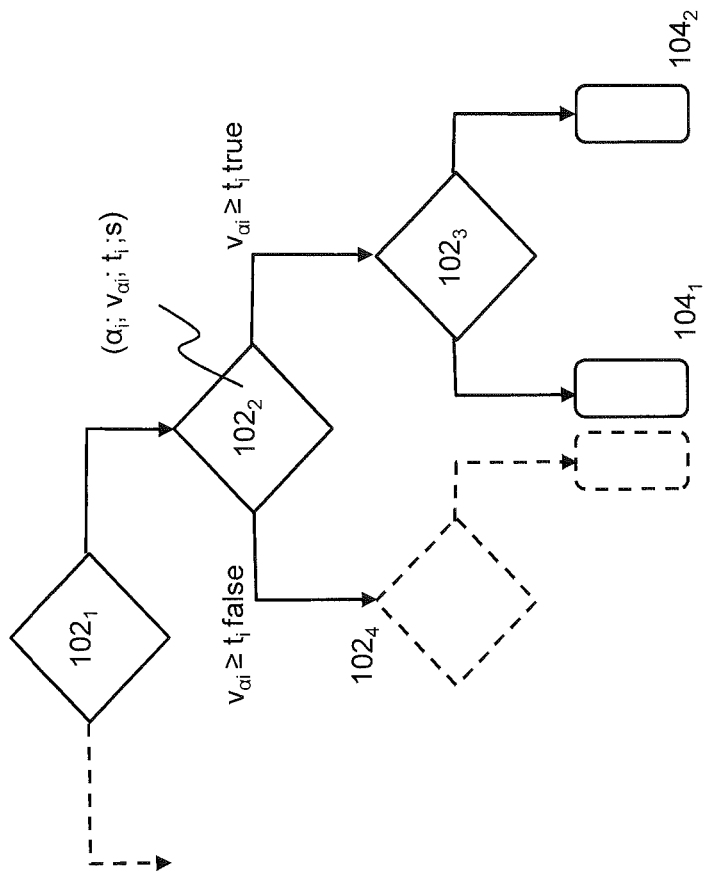
FIG. 1A-1D schematically depict linear branching programs.

FIG. 1A schematically depict parts of linear branching program, which are configured to evaluate a user input. A linear branching program may be part of an expert system e.g. a medical, financial or a remote software fault diagnosis system. In such a branching program, certain parts of the program may be determined using dedicated expertise in a particular field of use and/or numerous experimental tests. Those parts thus comprise commercially sensitive information, which should not be accessible to third parties. For example, in the example of FIG. 1A, the linear branching program may represent an ECG classification or biometric recognition program that is configured to evaluate user input in the form of ECG information of (part of) an ECG scan of a patient or biometric information, e.g. an image of a fingerprint or face. The automatic evaluation of this information by the program may be used in the diagnosis of certain hart disorders or in a biometric authentication procedure.

The user input may be processed into one or more user attributes $v_1, \ldots, v_n$. In an embodiment, the user attributes may e.g. relate to processed features that are extracted from (part of) an image, e.g. an ECG scan, a fingerprint or a face using a well-known feature extraction algorithm. The user attributes may be input to the linear branching program that evaluates the user attributes on the basis of program information that may be stored in a database.

The branching program may comprise decision nodes $102_{1-4}$ and end-labels $104_{1,2}$ (sometimes also referred to as leaves), which are structured in a binary (decision) tree. In an embodiment, the program may comprise k nodes and k+1 end-labels. The tree may be evaluated in a linear way by evaluating nodes starting with the root node and going downwards via the decision node until one of the end-labels has been reached wherein the end-label represents the output of the program. At each decision node user input, e.g. a user attribute $v_i$, may be evaluated on the basis of a threshold, e.g. threshold $t_j$ 104. In some embodiments, all thresholds may have the same value (e.g. zero in case of a linear branching program for classifying features). In other cases, each node is associated with a different threshold value.

On the basis of the evaluation, the decision node makes a decision which node may be evaluated next. In order to relate a user attribute to a node, the linear branching program may use node indices $\alpha_j$ wherein $1 \leq \alpha_j \leq n$. Hence, user attribute $v_{\alpha j}$ represents the user attribute associated with node j and threshold $v_j$. The node indexes may be configured such that in each node a user attribute needs to be evaluated on the basis of least one threshold.

In an embodiment, an evaluation at a decision node may include a comparison operation wherein a user attribute is compared with a threshold. A comparison parameter may be used to indicate the type of comparison that is calculated at a node. For example, in an embodiment s may be defined as: $s \in \{-1,1\}$ wherein s=−1 may indicate a "≥" comparison and s=+1 may indicate a "<" comparison. This way, a node with node index $\alpha_j$, threshold $t_j$ and user attribute $v_{\alpha j}$ may be associated with comparison parameter s=−1 indicating that the comparison $v_{\alpha j} \geq t_j$ needs to be calculated at that node. Alternatively, the node may be associated with comparison parameter s=1 indicating that the comparison $v_{\alpha j} < t_j$ needs to be calculated at that node. The comparison parameter may be used to keep the type of comparison secret from the user.

On the basis of this calculation, a decision is made which node should be evaluated next. For example, when comparing a user attribute and a threshold associated with a first node $102_1$, the program may determine that the user attribute is larger than or equal to the threshold (i.e. $v_{\alpha j} \geq t_j$ is true). The program may use this result in a (binary) decision rule associated with that node in order to determine a pointer to a next decision node, i.e. second decision node $102_2$ that should be evaluated. This process may be repeated until an end-label has been reached.

Figures 1B, 1C:
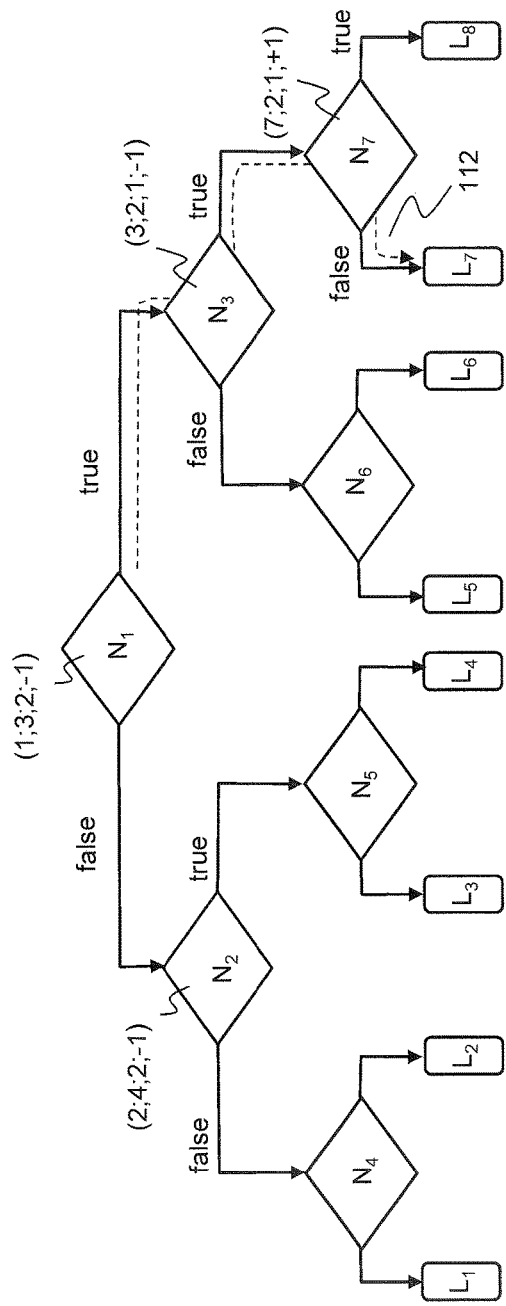

FIGS. 1B and 1C depict an exemplary linear branching program and a decision table associated with the program. The linear branching program may comprise a number of nodes, e.g. seven nodes $N_1, N_2, N_3, N_4, \ldots, N_7$ and a number of leafs $L_1, L_2, \ldots, L_8$ wherein each node may be associated with a threshold $t_1, t_2, t_3, t_4, \ldots, t_7$ and a user attribute $v_1, v_2, v_3, v_4, \ldots v_7$ respectively. A user attribute vector $v=(v_1, v_2, v_3, v_4, \ldots v_7)=(3,4,2,\ldots,2)$ 116 may be input to the linear branching program which may compare at each node a user attribute with a threshold. Different types of comparison calculations, e.g. "<", "≤", ">" or "≥", may be determined at a node. The type of comparison at a node may be determined by the comparison parameter s as explained with reference to FIG. 1A. Starting at the root of the decision tree, the outcome of a comparison (true or false) at a node may determine which node is evaluated next. In an embodiment, a binary decision rule associated with the node may use the outcome of a comparison (e.g. ("true" or "false" at node $N_3$) in order to determine the next node that needs to be evaluated (e.g. the evaluation of the comparison 2≥1 in $N_3$ is true so that the comparison in node $N_4$ is evaluated next). This process may be repeated until an end-label is reached (e.g. L4). Processing of the reference and user attributes at each node as given in the example of FIG. 1B results in the selection of a path 112 that goes through the decision tree starting from the root node $N_1$ via one or more nodes (in this case nodes $N_3$ and $N_7$) to an end-label (in this case end node $L_7$).

FIG. 1C depicts a table 114 that illustrates the information that may be used during the evaluation of the linear branching program. This information may include program information and user input information. The program information may include the node indices, (commercially sensitive) thresholds and end-labels and decision rules associated with the nodes. In an embodiment, the program information may comprise one or more comparison parameters associated with the nodes. Similarly, the input information may include user data, e.g. user attributes. The (binary) decision rules for each node may form a decision table that determines the path through the decision tree. A decision rule associated with a node may use the outcome (true, false) of the calculation at a node in order to determine a pointer to a decision node or an end-label, wherein an end-label may represent a possible outcome (output) of the program.

It is submitted that the linear branching programs depicted in FIG. 1A-1C are merely examples and many variations in the structure of the branching program and the (type of) comparison at a node are possible without leaving the scope of the invention. For example, in an embodiment a comparison operation $v_{\alpha j}=t_j$ or $v_{\alpha j} \neq t_j$ may be computed. In yet another embodiment, a comparison operation $v_{\alpha j} < t_j$, $v_{\alpha j} \geq t_j$ or $v_{\alpha j} = t_j$ may be computed. In more general, an arbitrary "n-ary" node may be constructed on the basis of binary nodes. Such comparisons may be implemented in a binary tree similar to the one described with reference to FIG. 1A. Further, $v_{\alpha j}$ may be input to an arbitrarily function $f(v_{\alpha j})$ before determining a comparison, i.e. $f(v_{\alpha j}) < t_j$. The function f may be a linear function or a non-linear function. In case of a linear function, the server may calculate this function in the encrypted domain using encrypted inputs. Alternatively, the client may provide the server with both an encrypted version of the input and an encrypted version of $f(v_{\alpha j})$.

Figure 1D:
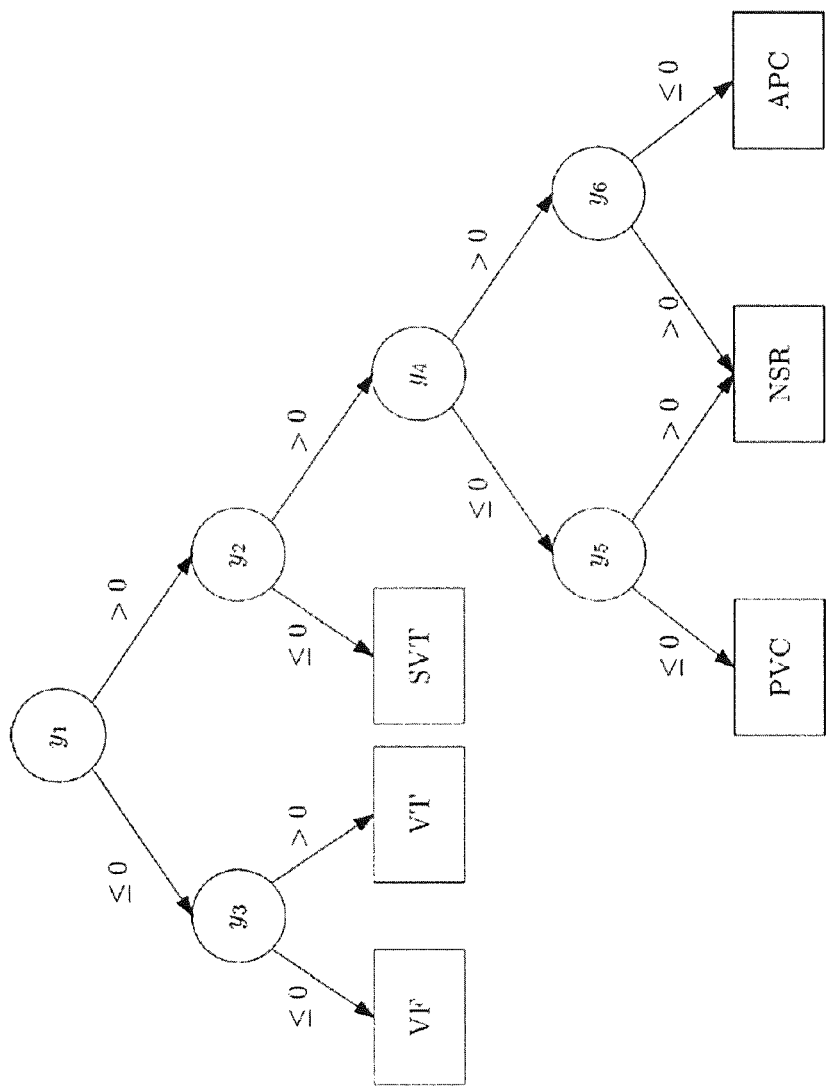

FIG. 1D depicts a further example of a linear branching program that may be securely evaluated using the secure computing system according to this disclosure. In this particular example FIG. 1D depicts a decision tree for ECG classification as described in the article by Barni et al. "Privacy-Preserving ECG Classification With Branching Programs and Neural Networks", IEEE Transactions on Information Forensics and Security, Vol. 6, No. 2, June 2011. The decision tree shows that the heartbeat can be classified into six possible classes: Normal Sinus Rhythm (NSR), Artrial Premature Contraction (APC), Premature Ventricular Contraction (PVC), Ventricular Fibrillation (VF), Ventricular Tachycardia (VT) and Supraventricular Tachycardia (ST). These six classes are the six end-labels of the linear branching program. In order to obtain the classification values $y_1 \ldots y_6$ the following computations are performed:

1. The user enters four AR model coefficients $f_1 \ldots f_4$ e.g. computed by his ECG device, which form the feature vector f;
2. This feature vector f may be expanded by the personal ECG device to a composite feature vector $f^e$ with 15 features, $(1, f_1, f_2, f_3, f_4, f_1^2, f_2^2, f_3^2, f_4^2, f_1 f_2, f_1 f_3, f_1 f_4, f_2 f_3, f_2 f_4, f_3 f_4)$;
3. The secure server computes the classification values (the user attributes) through a matrix multiplication: $y=B f^e$, where the matrix B contains the commercially sensitive knowledge obtained through a set of training ECGs.

Similar to the linear branching program of FIGS. 1A and 1B, the program has user input (feature vector f) and node indices $\alpha_j$, $j=1, \ldots, 6$ and at each node the sign of a user attribute $y_i$ is evaluated, i.e. large of smaller than zero. In this example however, the commercially sensitive program information is not the thresholds (since they are all zero) but the matrix B used to transform the user input (the user attributes) into a set of classification values $y_j$.

Hence, from the above, it follows that a linear branching program comprises a number of nodes associated with a node index $\alpha_j$. Nodes are evaluated on the basis of user attributes (i.e. user input information) and program information, i.e. thresholds, wherein an evaluation of a node comprises a comparison operation between a user attribute and a threshold value. The outcome of the comparison (true or false) may determine the next node for evaluation. This process is repeated until an end-label is reached, which determines the output of the program.

Figure 2A:
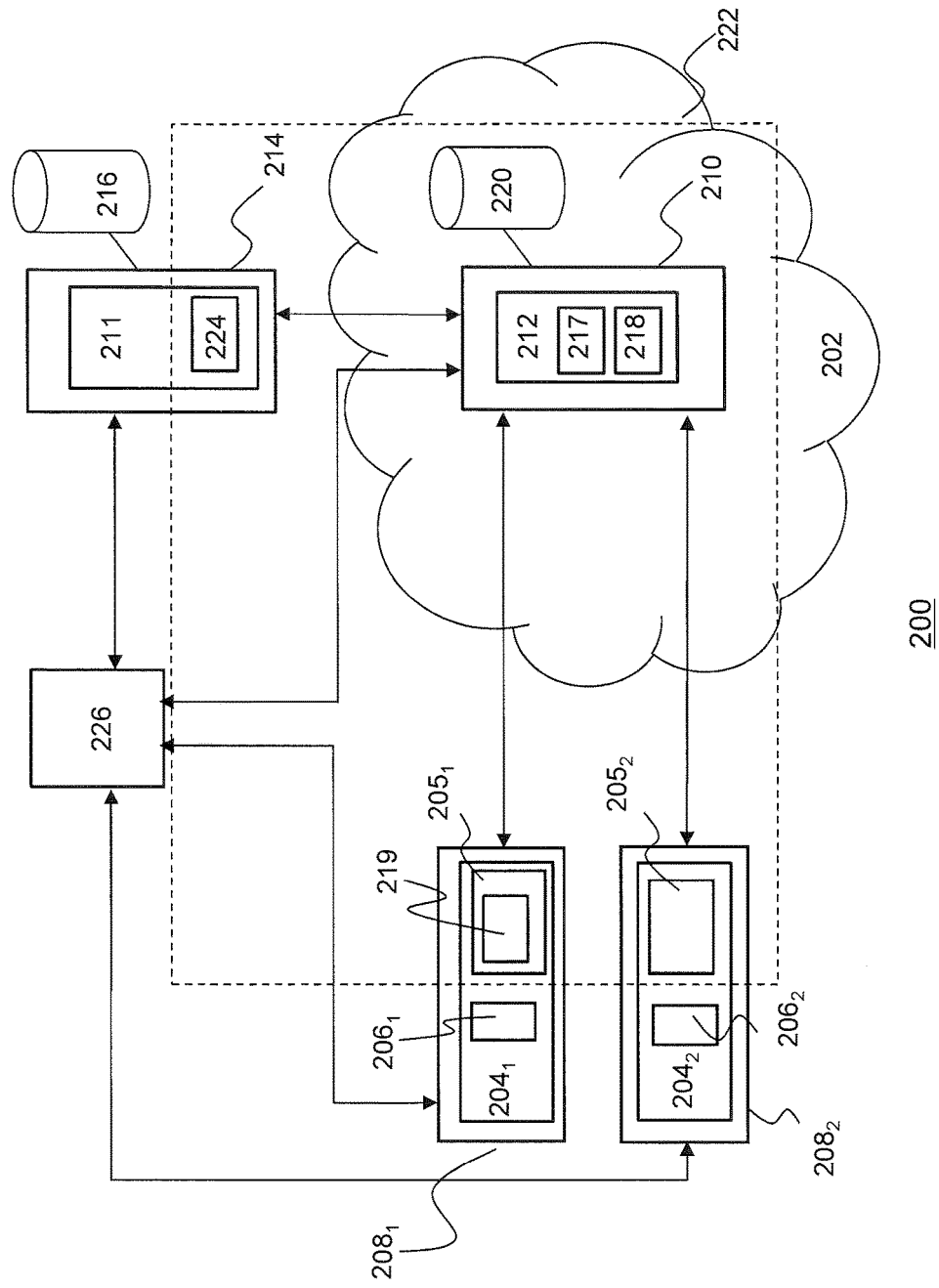
FIG. 2A depicts a secure computing system according to an embodiment of the invention.

FIG. 2A depicts a secure computing system 200 that is configured for secure processing of privacy sensitive data by a linear branching program according to an embodiment of the invention. As will be described hereunder in more detail, the system in FIG. 2A enables secure outsourcing of the storage and evaluation (execution) of a software program comprising a linear branching program using (privacy sensitive) user data as input to the program.

The computing system may be configured as a computer platform 202 for providing data processing systems to have ubiquitous, convenient and on-demand network access to a shared pool of configurable computing resources (e.g. networks, servers, storage, applications, and services). In an embodiment, the data processing systems may comprise one or more clients (CL) $204_1$, $204_2$. In another embodiment, data processing systems may comprise at least one secure (network) server 210 for hosting at least one network application (NA) 212. In an embodiment, the platform may relate to a cloud platform (the cloud) and the application server (the secure server 210) may be a cloud server for hosting one or more cloud applications (CA). As will be described hereunder in more detail, the network application on the application server may be configured to determine a personalized and encrypted version of the linear branching program, which may be independently and securely evaluated by the user device.

A client $204_{1,2}$ that is implemented on a (mobile) user device $208_{1,2}$ may be configured to access the network applications on the application server. Here, a user device may relate to a computer, smart phone, an electronic tablet, etc. Alternatively, a user device may relate to a sensor device that is configured to measure data. In an embodiment, the sensor device may be a medical sensor device that is configured to measure and process medical data of a patient, e.g. an ECG scan or a blood pressure value. In another embodiment, a user device may relate an image-processing device, e.g. a surveillance camera that is configured to capture and process image data in surveillance applications or a fingerprint capturing device that is configured to capture and process imaged fingerprint data.

Further applications may include Machine-to-Machine and/or Internet-of-Things applications wherein privacy sensitive sensor parameters are evaluated by a linear branching program that is hosted in the cloud. The sensor parameters may be obtained by smart sensors that are installed at home and the evaluation of the measured sensor parameters by the program may be used to analyze the use of certain apparatuses by the user.

The client may be configured to communicate with a network application in the network using a suitable protocol such as an HTTP-based protocol. Further, the client may be configured to control one or more interfaces, e.g.: a (graphical) user interface such as a display including a touch screen or the like, so that a user may interact with the network application; and/or a sensor interface for at least one sensor input such as an ECG, blood pressure and/or image sensor.

The network application may be a software program that is configured to enable secure outsourcing of the exploitation (storage and evaluation) of a linear branching program that is owned by a third-party software provider. The software provider may use a software provisioning server 214 comprising a software delivery application (SDA) 211 in order to deliver at least part of a linear branching program to the application server, which may store the application in a software database 216. The linear branching program may be stored in a software database in the form of program information as described with reference to FIG. 1A-1C.

Outsourcing (part of) the storage and execution of a linear branching program to a third-party application server, e.g. a cloud server, may increase the risk of exposing commercially sensitive information to a third party, e.g. the operator of the application server. Similarly, when requesting execution of the linear branching program, a user may be required to send privacy sensitive user data to the application server thereby increasing the risk that a third party, e.g. the operator of the application server, gains unauthorized access to privacy sensitive information. For this reason, a software provider may be reluctant to outsource storage and execution of its software programs. Similarly, a user may be reluctant to provide personal data to a software program that is executed in the network. These security and privacy issues may seriously impede users and software providers to use network solutions such as the cloud for evaluation of sensitive user data by a linear branching program.

In order to counter this problem, the application server may be configured to use encrypted user data in order to determine a personalized and encrypted version of the linear branching program that can only be evaluated by a client in a user device that has requested evaluation of these user data. To that end, the user device may comprise an evaluation function $206_{1,2}$ configured to evaluate the personalized version of the linear branching program. In order to determine a personalized and encrypted version of the linear branching program, the secure computing system depicted in FIG. 1 may use one or more homomorphic cryptosystems wherein a cryptosystem may comprise at least an encryption algorithm and decryption algorithm for encrypting data and decrypting encrypted data on the basis of an encryption key and a decryption key respectively.

The group of homomorphic cryptosystems comprises cryptosystems that exhibit the property that processing two encrypted data units $x_1$ and $x_2$ in accordance with a first algebraic function equals the processing of the two data units $x_1$ and $x_2$ in accordance with a second algebraic function in the encrypted domain. Such processing may be referred to as a homomorphic computation.

In an embodiment, the homomorphic cryptosystem may be an additive homomorphic cryptosystem configured for allowing additive homomorphic computations. In that case, multiplying a first encrypted data unit $x_1$ encrypted on the basis of a first encryption key $e_1$ with a second encrypted data unit $x_2$ encrypted on the basis of a second encryption key $e_2$ is equal to adding the two data units in the encrypted domain, i.e.: $[x_1]*[x_2]=[x_1+x_2]$ mod N, wherein N is the bit length of the encryptions of $x_1$ and $x_2$. Here, the brackets [ . . . ] indicate a short notation of the encrypted form of the integer (attribute) value within the brackets. In an embodiment, the Damgard, Geisler, Kroigaard (DGK) cryptosystem or the Pallier cryptosystem may be used as an additive homomorphic cryptosystem.

In another embodiment, the homomorphic cryptosystem may be a multiplicative homomorphic cryptosystem for multiplicative homomorphic computations. In that case multiplying two encrypted data units $x_1$ and $x_2$ is equal to multiplying the two data units in the encrypted domain: $[x_1]*[x_2]=[x_1*x_2]$ mod N.

The secure computing system may use at least a first and second homomorphic cryptosystem, wherein the first cryptosystem may be used for secure communication between a user device and the application server and the second cryptosystem may be used for secure communication between the software provisioning server and a user device respectively. Furthermore, as will be described hereunder in more detail, one or more cryptosystems may be used to process data (e.g. add, multiply and/or compare) in the encrypted domain.

The client in the user device may comprise (or be associated with) a first secure module $205_{1,2}$ comprising the encryption and decryption algorithms associated with the first and second cryptosystem. Similarly, the software delivery application in the software provisioning server may comprise a second secure module 224 comprising the encryption and decryption algorithms associated with the first and second cryptosystem. A key generating server 226 (key generator) may comprise first and second key generating algorithms for generating keys associated with the first and second cryptosystem respectively and for distributing these keys to the respective first and second secure modules. Alternatively, in an embodiment the first and second key algorithms may be implemented in two separate key generators (not shown).

This way, the user device may use the first secure module to encrypt user data (user attributes $v_1, \ldots v_n$) into encrypted user data (encrypted user attributes $[v_1], \ldots, [v_n]$) before these data are sent to the application server wherein an encrypted user attribute may be an integer value comprising 1 bits. The first secure module may also be used to decrypt encrypted data originating from the network and/or the software provisioning server.

In certain embodiments the user device may decrypt an encrypted blinded node value into a blinded node value on the basis of a second homomorphic crypto system, preferably the Pallier cryptosystem. In other embodiments the same user device may alternatively and/or additionally decrypt at least one encrypted evaluation sequence on the basis of a first homomorphic crypto system, preferably the DGK system. The first and the second, preferably additive, homomorphic cryptosystems may be the same, or different.

Furthermore, the evaluation of the evaluation sequence optionally including the step of decrypting the encrypted evaluation sequences, may be performed by a different user device than the (user) device that provides the encrypted user attributes (e.g. encrypts the user attributes). For example a monitoring device configured for monitoring certain parameters related to the functioning of the human body could provide the encrypted user attributes (and optionally decrypt the encrypted blinded node values), whereas another user device, such as a personal computer system of a user, could perform the evaluation of the evaluation sequences (including the decryption of the encrypted evaluation sequences if needed).

The second secure module 224 directly attached to or comprised in the software provisioning server may be used to encrypt at least part of the linear branching program, in particular part of the program information, before it is sent to the application server. In particular, the second secure module may encrypt the commercially sensitive program information (e.g. thresholds $t_j$ and/or matrix elements of a matrix B for transforming user input into classification values) and end-labels $L_j$, and send (provide) this encrypted information to the application server, which will store the encrypted program information in a secure database. The encrypted thresholds may be sent in random order to the application server. Further, the second secure module may be used to decrypt encrypted data originating from the network or the user device.

A program transformation function 218 in the network application may use a homomorphic cryptosystem in order to generate a personalized and encrypted version of the linear branching program on the basis of the encrypted program information, the node information and the encrypted user attributes that are stored in the secure database 220. A network pre-processing function 217 in the network application and a client pre-processing function 219 may pre-process at least part of the encrypted program information, before it is provided (e.g. via transmission or otherwise) to the program transformation function.

In an embodiment, the network pre-processing function may be configured to relate for each node one or more encrypted user attributes $[v_j]$ to encrypted program information, e.g. associated encrypted threshold $[t_j]$, using the node indices $\alpha_j$ that are stored as part of the node information in the secure database. In a further embodiment, the network pre-processing function may be further configured to use the homomorphic properties of the first cryptosystem in order to combine the threshold and the user attribute with a relatively large random number $b_{\alpha j}$, a blinding value, in order to determine a first encrypted blinded node value $[v_{\alpha j} - t_j + b_{\alpha j}]$, i.e. a blinded node value encrypted on the basis of a first cryptosystem. Here, the blinding value (an integer of sufficient bit length) is used to avoid leakage of information on the program information to the user. An encrypted blinded node value may be generated for each node or at least a part of the nodes in the linear branching program may be sent to the program transformation function.

To that end, the secure module in the client may be configured to decrypt at least part of an encrypted blinded node value into a blinded node value $d_j = v_{\alpha j} - t_j + b_{\alpha j}$. The client pre-processing function 219 may pre-process the blinded node values by determining the binary representation of the blinded node value $d_j = d_{j,1+S-1} \ldots d_{j,1} \, d_{j,0}$ (decryption) and to re-encrypt it bitwise, i.e. by computing the encrypted values of the 1+S bits into 1+S separately encrypted values $[[d_{j,i}]]$ where the double brackets $[[\ldots]]$ represent a notation of the DGK cryptosystem which is dedicated to small value encryptions. The DGK bitwise encrypted version of the blinded node values may then be sent to the program transformation function, which may compare encrypted values for each node.

In an embodiment, the DGK bitwise encrypted version of the blinded node value (in short a DGK bitwise encrypted blinded node value $[[v_{\alpha j} - t_j + b_{\alpha j}]]_B$) may be compared with the DGK bitwise encrypted version of the blinding value (in short a DGK bitwise encrypted blinding value $[[b_{\alpha j}]]$). In that case, for each node or at least a part of the nodes in the program, the comparison $v_{\alpha j} - t_j + b_{\alpha j} < b_{\alpha j}$ or $v_{\alpha j} - t_j + b_{\alpha j} \geq b_{\alpha j}$ may be calculated (wherein the type of comparison, e.g. "<" or "≥", may depend on the comparison parameter s).

In an embodiment, the program transformation function may use a DGK comparison protocol in order to compare for each node the bitwise encrypted values (e.g. a threshold and an associated user attribute). For each node, the DGK comparison protocol may use the homomorphic property of the second homomorphic cryptosystem in order to compute the encrypted exclusive-or $[[x_1 \oplus x_2]]$ from $[[x_1]]$ and $x_2$. The result of a comparison on the basis of the DGK comparison protocol at a node j may be a sequence of encrypted values $[[c_{ij}]]$ associated with a node j, wherein the result of the comparison (true or false) for that node is securely embedded in this sequence of encrypted numbers. The sequence of encrypted numbers may hereafter be referred to as an encrypted evaluation sequence. The set of encrypted evaluation sequences $[[c_{ij}]]$ of the nodes of the program may therefore be regarded as the personalized and encrypted version of the nodes of the linear branching program.

The personalized and encrypted version no longer comprises the sensitive information (user attributes and/or program information) and the outcome of comparison computation at each node is securely embedded in a sequence of numbers (the evaluation sequence).

The evaluation information for the program evaluation function, i.e. the evaluation sequences $[[c_{ij}]]$ of the nodes, the node indices and binary decision rule for the nodes, may be sent for evaluation to the program evaluation function $206_{1,2}$ in the client. The encrypted evaluation sequences may be decrypted and the decrypted (plaintext) evaluation sequences may be evaluated by the program evaluation function starting with evaluation sequence of the root node. The program evaluation function may use one or more predetermined binary decision rules that allow the program evaluation function to make a (binary) decision which node should be evaluated next. For example, an decision rule may be based on detecting the presence of a predetermined number, e.g. "0", in the evaluation value. If this predetermined number is detected, the decision rule may determine that the outcome is "true". This result may be used by the binary decision rule of that node in order to determine the index of a node that should be evaluated in the next step. This process may be repeated until an index of an end-label is identified. The end-label represents the outcome of the evaluation.

Thereafter, the evaluation function may request the identified label from the network application. In an embodiment, the evaluation function may receive the encrypted end-labels from the network application and select—on the basis of the identified index—an encrypted end-label. In an embodiment, the encrypted end-label may be blinded before it is sent to the software delivery application, which may decrypt the encrypted and blinded end-label and send the blinded end-label back to the client. After unblinding the end-label, the client may use the end-label to generate a program output.

Hence, from the above it follows that the secure computing system as depicted in FIG. 2A comprises a network application that is configured to convert a linear branching program into an encrypted and personalized version of the linear branching program. The encrypted and personalized version may comprise a set of evaluation sequences associated with the nodes in the program. The network application may calculate the comparison at each node in the encrypted domain using the homomorphic properties of the cryptosystem and the information regarding the outcome of a comparison at a node (e.g. $v_j \geq t_j$ or $v_j \leq t_j$) may be securely embedded in an evaluation sequence associated with that node.

The user device may be configured for decrypting the encrypted evaluation sequences and evaluating the linear branching program from the root to an end-label by evaluating the decrypted evaluation sequence of the root node and selecting a next node on the basis of that evaluation. As the encrypted version of the linear branching program only comprises information on the outcome of the calculations at the nodes, no information on the commercially sensitive parameters of the program (e.g. the thresholds) can be leaked to the user during the evaluation process.

Further, the user device is configured to evaluate the evaluation sequences on the basis of the node information that comprises the node indices and the binary decision rules associated with nodes. This way, the user device may evaluate the linear branching program independently without the necessity to interact with the network application.

In contrast with other schemes such as the use of Garbled Circuits, the client only needs to evaluate the nodes on the path that lead to the end-label. Hence, the evaluation process is very efficient in terms of processing power. During evaluation, the client only learns a random path through a binary tree. For each evaluation, a new set of evaluation sequences is created so that it is not possible to for the client to correlate sets of evaluation sequences associated with different user inputs.

The homomorphic cryptosystems enable the secure computation system to process the privacy sensitive user data and the commercially sensitive part of the software program in the encrypted domain wherein the first and second secure modules may form the interface between a plaintext domain and an encrypted domain (i.e. the area within dotted area 222).

It is submitted that the secure computing system in FIG. 2A is just a non-limiting example and many variants are possible without leaving the scope of the invention. For example, in one embodiment, two separate key generators may be used in order to generate keys for the first and second cryptosystem. Moreover, in an embodiment, the first cryptosystem may be identical to the second cryptosystem.

Figure 2B:
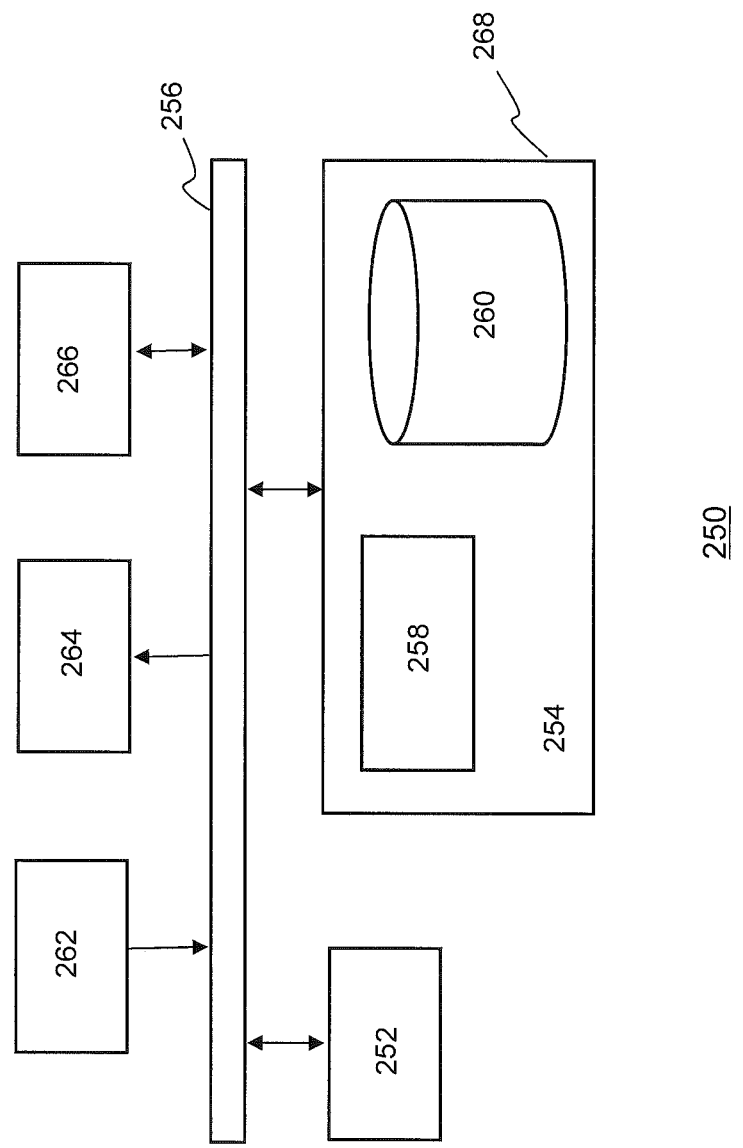
FIG. 2B depicts a schematic of data processing system for use in a secure computing system.

One or more embodiments disclosed within this specification a secure computing system using a client-server type of architecture. In accordance with the one or more embodiments disclosed herein, secure computing system may be operated as a Web Service being available to service requests issued through a client-server type of architecture. FIG. 2B is a first block diagram illustrating an exemplary data processing system that may be used in a secure computing system as described with reference to FIG. 2A.

Data processing system 250 may include at least one processor 252 coupled to memory elements 254 through a system bus 256. As such, the data processing system may store program code within memory elements 254. Further, processor 252 may execute the program code accessed from memory elements 254 via system bus 256. In one aspect, data processing system 250 may be implemented as a computer that is suitable for storing and/or executing program code. It should be appreciated, however, that system 250 may be implemented in the form of any system including a processor and memory that is capable of performing the functions described within this specification.

Memory elements 254 may include one or more physical memory devices such as, for example, local memory 258 and one or more bulk storage devices 260. Local memory may refer to random access memory or other non-persistent memory device(s) generally used during actual execution of the program code. A bulk storage device may be implemented as a hard drive or other persistent data storage device. The processing system 250 may also include one or more cache memories (not shown) that provide temporary storage of at least some program code in order to reduce the number of times program code must be retrieved from bulk storage device 260 during execution.

Input/output (I/O) devices depicted as input device 262 and output device 264 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 266 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 250.

As pictured in FIG. 2B, memory elements 254 may store an application 268. It should be appreciated that data processing system 250 may further execute an operating system (not shown) that can facilitate execution of the application. Application, being implemented in the form of executable program code, can be executed by data processing system 250, e.g., by processor 252. Responsive to executing application, data processing system may be configured to perform one or more operations to be described herein in further detail.

In one aspect, for example, data processing system 250 may represent a client data processing system. In that case, application 268 may represent a client application that, when executed, configures data processing system 250 to perform the various functions described herein with reference to a "client". Examples of a client can include, but are not limited to, a personal computer, a portable computer, a mobile phone, or the like.

In another aspect, data processing system 250 may represent a server. For example, data processing system 250 may represent an HTTP server in which case application 268, when executed, may configure data processing system 250 to perform HTTP server operations. In another aspect, data processing system 250 may represent a secure server, a software provisioning server or a key generating server as described in greater detail within this specification.

Figure 3:
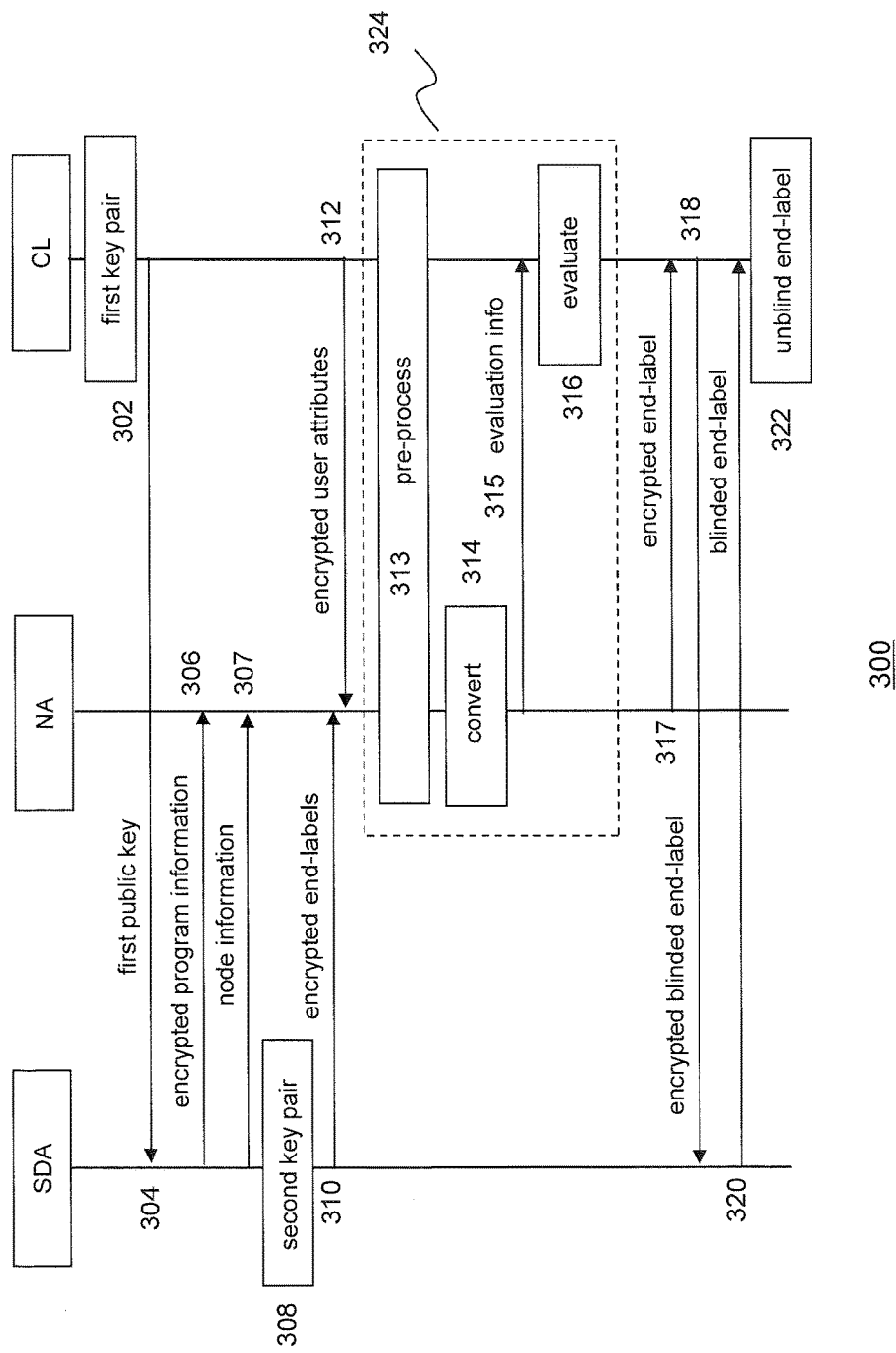
FIG. 3 depicts a flow diagram of a process for secure computing of privacy sensitive data by a computer program according to an embodiment of the invention.

FIG. 3 depicts a flow diagram of a process for secure computation of privacy sensitive data by a software program, in particular a linear branching program, according to an embodiment of the invention. The process may be used in a secure computing system as described with reference to FIG. 2 comprising a software delivering application (SDA), a network application (NA) and a client (CL).

The process may start with the software delivering application providing the network application with program information. Program information may include information associated with each node, e.g. thresholds and/or matrix elements of a matrix for transforming personal data in classification data, node indices and decision rules. In order to protect the commercially sensitive parts of the program and to evaluate the at least part of the nodes in the encrypted domain, at least part of the program information may be encrypted on the basis of an (additive) homomorphic cryptosystem such as the DGK or Pallier cryptosystem, before it is sent to the network application.

Hence, the process may start with providing a secure module in a client (step 302) with a key pair. In particular, a first public-private key pair comprising a first public key $e_1$ and a first private $keyd_2$ may be generated and provided to the secure module of the client. The first key pair may be generated by a key generator associated with a second cryptosystem. In an embodiment, the second cryptosystem may be an (additive) homomorphic cryptosystem such as the DGK cryptosystem. The first key pair may be re-used by the client in further evaluations of the program.

In an embodiment, the client may send the first public key e1 to the secure module in the software provisioning server (step 304). Alternatively, the key generator may provide the secure module of the software provisioning application with a public key. The secure module in the software provisioning server may use the first public key and an encryption algorithm associated with the first cryptosystem for encrypting program information. In an embodiment, the program information may comprise one or more thresholds $t_j$ and/or at least part of a matrix B for transforming user input information in classification values. The software provisioning server may send the encrypted program information to the network application (step 306), which may store the encrypted program information in a secure database.

Further, in an embodiment the software provisioning server may send information on the nodes of the program (node information) to the network application (step 307). In one embodiment, the node information may comprise one or more node indices $\alpha_j$ of a linear branching program wherein $1 \le \alpha_j \le n$ for nodes j, $1 \le j \le k$ wherein k is the number of nodes in the linear branching program. In another embodiment, the node information may further comprise comparison parameters $s_j \in \{-1, 1\}$ for nodes j, $1 \le j \le k$ in a linear branching program. In yet another embodiment, the node information may comprise a binary decision rule associated with a decision node. In an embodiment, a binary decision rule may comprise a reference (pointer) to at least a first node index if the outcome of the evaluation of a user attribute at a node is "false" and/or a reference (pointer) to at least a second node index if the outcome of the evaluation is "true". The node information is not part of the commercially sensitive program data, so that one may send this information to the network application without encrypting it.

In an embodiment, the end-labels may be sent in encrypted form to the network application. In an embodiment, the first public key may be used to encrypt the end-label. Alternatively, the end-labels may be encrypted using a different cryptosystem. For example, in an embodiment, a second key pair may be provided to the secure module in the software delivery application (step 308). In one embodiment, the second key pair may be a second public-private key pair ($e_2$, $d_2$) comprising at least a first public key $e_2$ and a first private key $d_2$. The key pair may be generated by a key generator comprising a key-generating algorithm associated with a second cryptosystem.

The second public key may be used by the secure module to encrypt the one or more end-labels $L_m$ of the linear branching program using an encryption algorithm associated with the second cryptosystem. The number of end-labels may depend on the structure of the linear branching program. In an embodiment, $1 \le m \le k+1$ wherein k is the number of nodes in a linear branching program. In its simplest form (k=1) a linear branching program may comprise one node comprising two possible outcomes represented by two end-labels $L_1$ and $L_2$. The encrypted first program information may be sent to the network application (step 310), which may store the encrypted end-labels in the secure database.

The generation of the first and/or second key pair may be executed once and may be reused for different clients. For example, in one embodiment, the key generator may publish the first and/or second public key at a location that is accessible to clients.

A client may receive (privacy sensitive) user input, via an interface of the user device and process the user input into a predetermined number of user attributes, e.g. user attributes $v_i$, $1 \le i \le n$. The secure module in the user device may use the first public key $e_2$ and the first encryption algorithm associated with the first cryptosystem in order to encrypt the user attributes into encrypted user attributes $[v_i]$. The encrypted user attributes $[v_i]$ may then be sent to the application server that hosts the network application (step 312), which may store the program information in the secure database. Hence, at this stage in the process, the secure database may comprise encrypted program information, encrypted user attributes, (encrypted) node information and (in some embodiments) encrypted end-labels.

In order to enable comparison computations between values in the encrypted domain, the encrypted program information and user attributes may first be pre-processed (step 313). The pre-processing may include the steps of:

associating an encrypted user attribute $[v_j]$ with encrypted program information (an encrypted threshold value $[t_j]$ using the node indices $\alpha_j$ for all (or at least a part of) the nodes in the linear branching program;

combining the encrypted threshold, the associated user attribute and a blinding value (a random number $b_{\alpha j}$) into a first encrypted blinded node value $[v_{\alpha j} - t_j + b_{\alpha j}]$ using homomorphic additions for all (or at least a part of) the nodes in the linear branching program;

decrypting (at least part of) the first encrypted blinded node values; and, determining bitwise encrypted blinded node values $[[v_{\alpha j} - t_j + b_{\alpha j}]]_B$ on the basis of an homomorphic cryptosystem, preferably the DGK cryptosystem.

Here, the blinding value may be used in order to hide the program information from the user when decrypting and re-encrypting the blinded node values. This way, the network and client pre-processing functions 217 and 219 (with reference to FIG. 2A) may prepare the encrypted node values as input for the program transformation function. The program transformation function may use the DGK bitwise encrypted blinded node values for a bitwise comparison computation in the encrypted domain. In an embodiment, the DGK encrypted blinded node value $[[v_{\alpha j} - t_j + b_{\alpha j}]]_B$ may be compared with the DGK encrypted version of the blinding value $[[b_{\alpha j}]]_B$. In that case, for each node or at least a part of the nodes in the program, the comparison $v_{\alpha j} - t_j + b_{\alpha j} < b_{\alpha j}$ or $v_{\alpha j} - t_j + b_{\alpha j} \ge b_{\alpha j}$ may be calculated.

In order to compare a user attribute with program information in the encrypted domain on the basis of the bitwise encrypted blinded node values, a DGK comparison algorithm may be used. This protocol and the evaluation of the information generated by the comparison protocol will be described in more detail with reference to FIG. 4. For each comparison, the DGK algorithm may generate a set of encrypted evaluation sequences $[[c_{ij}]]$ associated with the nodes in the program, wherein the outcome of the comparison is embedded in the evaluation sequence (step 314).

Thereafter, the client may be provided with the set encrypted values $[[c_{ij}]]$, the associated node indices and the binary decision rules associated with each node (step 315). The secure module in the user device may decrypt evaluation sequences and send them to the evaluation function for evaluation, starting with the evaluation sequence associated with the root node. The evaluation function may evaluate the value on the basis of a binary decision rule (step 316).

In one embodiment, the evaluation function may determine whether a sequence of numbers $c_{ji}$ associated with node j comprises a predetermined integer number, e.g. a zero "0". If a zero is detected, the outcome of the evaluation function is false, if not the outcome is true. A binary decision rule associated with a node may use the outcome (false or true) to determine the next node for evaluation, e.g. a node with node index $\alpha_k$, and start the evaluation of the sequence of values associated with node k.

This process may be repeated until the index of an end-label is identified. This index may be regarded as the output of the evaluation of the linear branching program by the user device wherein the user attributes are used as input for the program. The client may then execute a (secure) label assignment process in order to select an encrypted end-label on the basis of an end-label index that was the result of the evaluation of the node evaluation sequences.

In one embodiment, the evaluation function in the user device may signal the program transformation function in the cloud server to forward the encrypted end-labels to the client. On the basis of the determined end-label index, an encrypted end-label may be selected out of the set of encrypted end-labels originating from the cloud server. The selected encrypted end-label may be blinded by the evaluation function in the user device. To that end, a large random number may be generated. The secure module in the end user device may encrypt the random number on the basis of the first public key $e_1$ and the first encryption algorithm and add the encrypted random number to the encrypted end-label using an additive homomorphic computation.

The blinded encrypted end-label may be sent to the secure module of the software provisioning server (step 318), which may decrypt the blinded encrypted end-label into a blinded end-label, which may be sent back to the evaluation function in the user device (step 320) for unblinding the end-label by subtracting the large random number from the blinded end-label (step 322).

Hence, from the above it follows that the invention provides a multi-party, secure computing system wherein the storage and evaluation (execution) of the program is outsourced to a network provider (e.g. a cloud provider) that does not own the program and wherein—during evaluation of the program—privacy sensitive user data are not disclosed to the network provider and the software provider and wherein—during evaluation of the program—commercially sensitive parts of the program are not disclosed to the user device.

In contrast with prior art solution, the invention provides the software provider that owns the program absolute protection of its program and its usage. The commercially sensitive part of the program, such as the thresholds, will remain unknown to both the network provider and the users and is secure against a brute force attack with unlimited resources (i.e. perfect security). The method according to the invention may generate for each new user input a fresh secure version of the program, which may be evaluated by the user device. Hence, each time the user input changes a new version of the program has to be generated. This way, the number of executions of the linear branching program by a user device may be controlled.

Figure 4:
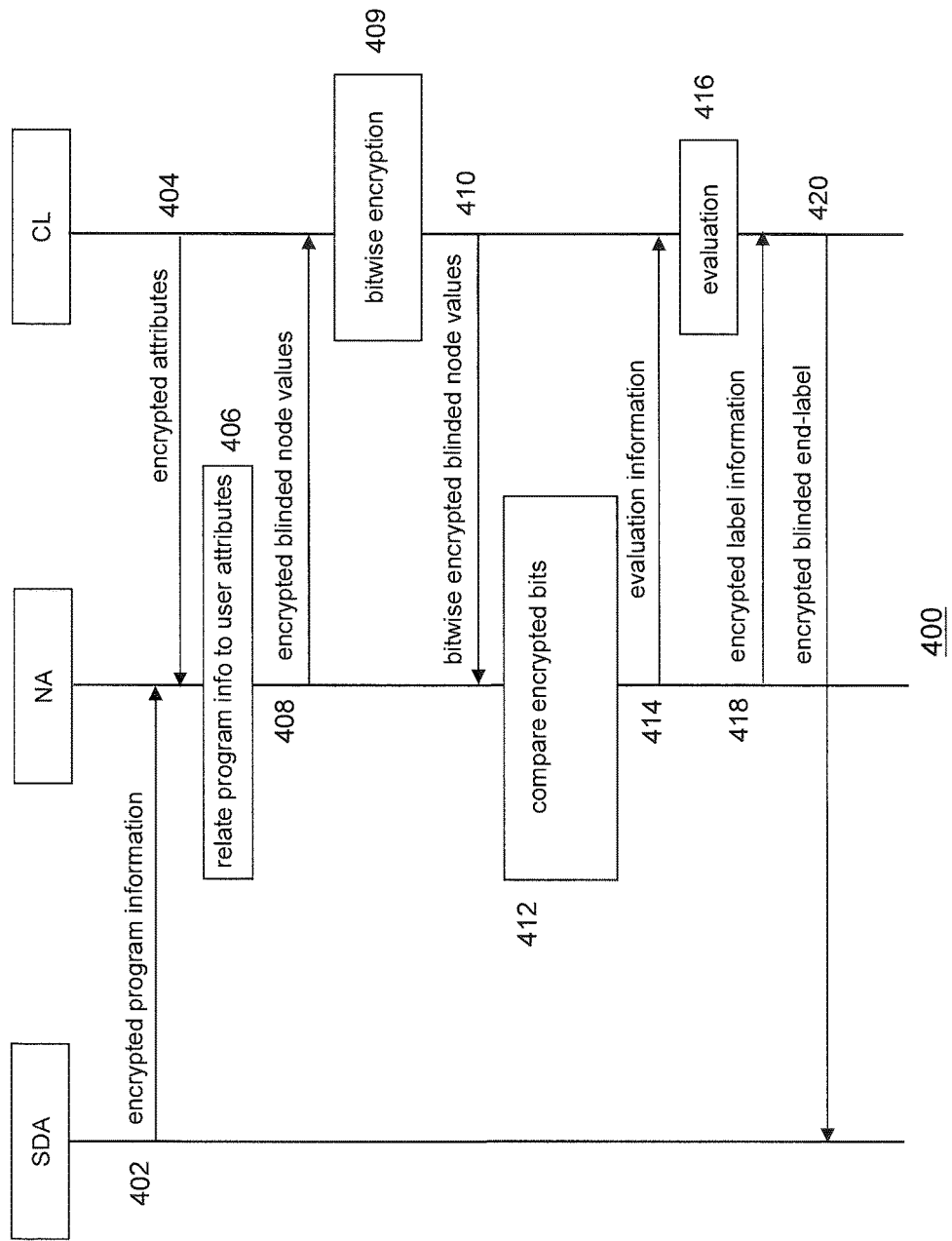
FIG. 4 depicts at least part of a flow diagram of a process for secure computing of privacy sensitive data by a software program according to another embodiment of the invention.

FIG. 4 depicts at least part of a flow diagram of a process for secure comparison and evaluation of a linear branching program according to an embodiment of the invention. In particular, FIG. 4 depicts a detailed embodiment of the pre-processing and the program transformation and evaluation processes as described with reference to FIG. 3. In this particular embodiment, the secure module in the user device may be provided with a DGK key pair of a DGK cryptosystem, which is a dedicated additively homomorphic cryptosystem wherein a user attribute v may be encrypted on the basis of a DGK public key such that $[v]=g^v*h^r \mod N$, wherein r is a fresh random number and g and h are elements of $Z_N^*$ of sufficient order.

In a first embodiment, the secure module in the user device may encrypt each user attribute $v_j$ thereby sending n*1 bits to the network application. In another embodiment, when n is relatively large (compared to k), the secure module may encrypt only n+k*(1+S) bits, wherein S is a statistical security parameter. In an embodiment, the statistical security parameter may be selected in a range between 60 and 100. This embodiment provides the advantage that less information needs to be sent to (and processed by) the network application.

The secure module of the software delivery application may also be provided with the public key of the DGK pair so that it can encrypt the thresholds associated with the nodes in the linear branching program.

The encrypted user attributes $[v_j]$ and the encrypted thresholds $[t_j]$ may be sent to the network application (steps 402 and 404). Thereafter, for each node j a pre-processing function of the network application and a client in the user device may execute the following steps:

the pre-processing function linking the encrypted user attribute $[v_j]$ to a node index $\alpha_j$ in order to form an (indexed) encrypted user attribute $[v_{\alpha j}]$ (step 406);

the pre-processing function combining $[v_{\alpha j}]$ with its associated encrypted threshold $[t_j]$ and a random blinding value $[b_j]$ on the basis of one or more homomorphic computations (e.g. additions) and sending an encrypted blinded node value $[v_{\alpha j}-t_j+b_j]$ to the client (step 408);

the client (preferably the secure module) decrypting the encrypted blinded node value $[v_{\alpha j}-t_j+b_j]$ into a blinded node value $v_{\alpha j}-t_j+b_j$ and bitwise encrypting bits of the blinded node value on the basis of the DGK encryption algorithm (step 409) and sending the bitwise encrypted blinded node values $[[v_{\alpha j}-t_j+b_j]]_B$ (i.e. $[[d_{ji}]]$ for i=0, 1, . . . 1+S−1) back to the pre-processing function (step 410).

The bitwise encrypted blinded node values may be used in a comparison step, which is executed by the program transformation function of the network application. In an embodiment, the comparison $v_{\alpha j}-t_j+b_{\alpha j}<b_{\alpha j}$ (instead of the comparison $v_{\alpha j}<t_j$) will be performed using a DGK comparison algorithm. In embodiment, $b_j$ should be between 60 and 100 bits, preferably around 80 bits larger than the 1 bits of $v_{\alpha j}$ and $t_j$ in order to sufficiently blind the thresholds $t_j$.

The program transformation function may create a secure and personalised version of the branching program. To that end, the program transformation function may compute for each node the comparison $v_{\alpha j}-t_j+b_{\alpha j}<b_{\alpha j}$ using the DGK comparison protocol (step 412). Each comparison may generate 1 encrypted values $[c_{ji}]$, $0\le i\le 1+S$ for each node j, $1\le j\le k$, wherein S may be selected between 60 and 100. The comparison variable s may be used to mask whether a "smaller than" or a "larger than" comparison is computed by the program transformation function.

Figure 5:
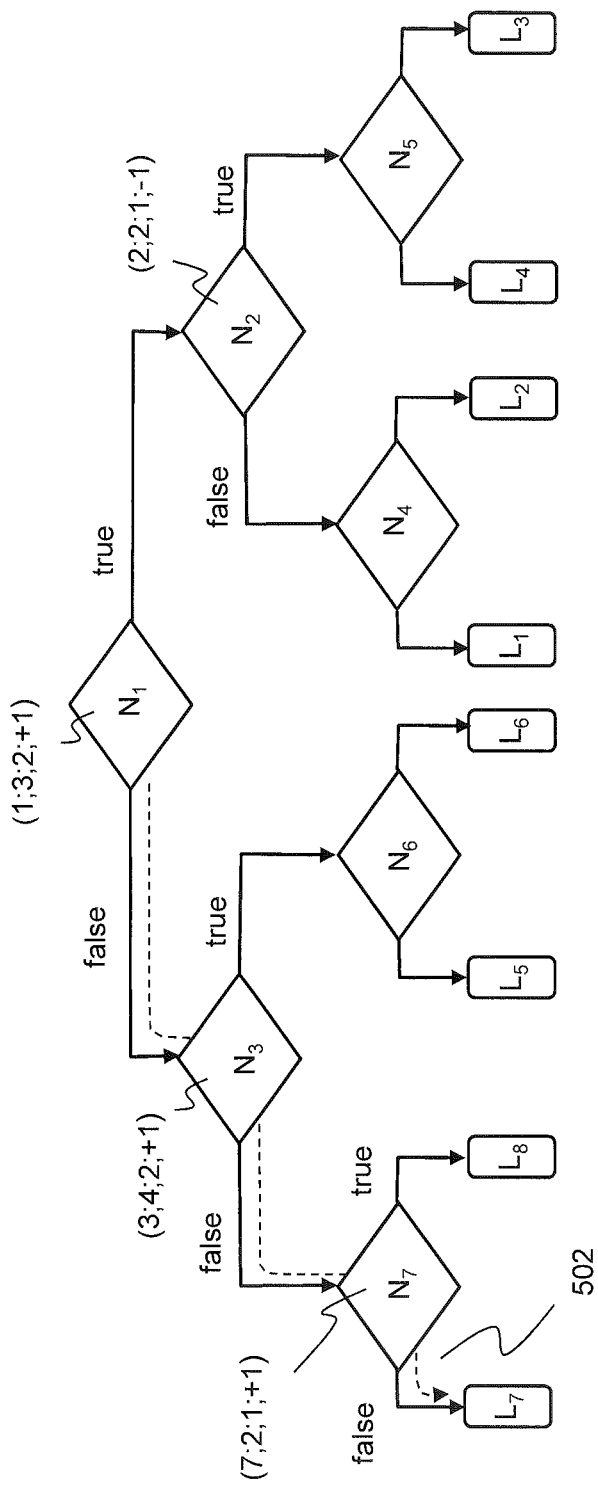
FIG. 5 depicts at least part of a linear branching program.

Further, in an embodiment, the program transformation function may randomize the path through the decision tree for each user. To that end, the program transformation function may reverse the comparison parameters s (e.g. from > into ≤) and the associated binary decision rules so that for each randomized version the path leads to the correct end-label. An example of a randomized version of the decision tree of FIG. 1B is given in FIG. 5. In the example, the comparison parameters and decision rules of nodes 1 and 2 are reversed resulting in a path 502 that differs from the path 112 in FIG. 1B.

Hence, for each node an evaluation sequence is generated by the program transformation function, which may be sent for evaluation to the evaluation function of the client in the user device (step 414).

The user may decrypt the encrypted the evaluation sequence and evaluate the decrypted numbers by checking whether the sequence of values $c_{ji}$ comprises a zero or not (step 416). This evaluation is equivalent to the user device checking whether $v_{\alpha j} < t_j$ or $v_{\alpha j} \geq t_j$. This way the user device may evaluate each node without actually knowing the information used in the calculation of a comparison. In some embodiments decryption is not needed and the step of evaluating the sequence of encrypted values does not include the step of decrypting these into plaintext. Hereunder, the computations used by the DGK comparison algorithm are described in more detail. The algorithm may be used to compare d with r, wherein $d=d_j=v_{\alpha j}-t_j+b_j$ and $r=b_{\alpha j}$. Here, the values d and r comprise bits $d_i$ and $r_i$, $0 \leq i < 1+S$, respectively.

The program transformation function knows whether $d<r$ or $r<d$ should be computed at a node and selects the comparison parameter $s \in \{-1,1\}$ accordingly. That is, if $d<r$ is to be computed, $s=1$ should be chosen, and $s=-1$ otherwise.

Next, the encrypted values $[[c_1]]$, $0<i<1+S$, are computed using the additively homomorphic property of the encryption system:

$$[[c_i]]=[[d_i-r_i+s+3^*\Sigma_{j=i+1\ldots i+L-1}w_j]]=[[d_i]]^*[[r_i]]^{-1}*[[s]]^*(\Pi_{j=i+1\ldots i+L-1}[w_j])^3 \bmod N,$$

where $$[[w_i]]=[[r_i \oplus d_i]]=[[d_i]], \text{ if } r_i=0, \text{ and}$$

$$[[1-d_i]]=[[1]]^*[[d_i]]^{-1} \bmod N, \text{ otherwise.}$$

This may be illustrated by observing that $c_i=0$ exactly when the $i-1$ most significant bits are equal and the $i^{th}$ bits of d and r differ. Therefore, d will be smaller (or greater depending on the choice of s) than r exactly when one of the $c_1$ will be zero, and larger if none of them are zero. To avoid the user learning the values $c_1$, which may leak (some) information on d or r, these values may be blinded by the program transformation function using a random non-zero number $p_i$:

$$[[c_i]]:=[[c_i^*p_i]]=[[c_i]]^{p_i} \bmod N$$

This multiplicative blinding (in the encrypted domain) of the $c_1$ ensures that no information about d or r is leaked towards the client (i.e. the module or device to which the user has access and which performs the evaluation of the evaluation sequence), irrespective of his computing power, achieving perfect security of the branching program. Thus, in certain embodiments of the invention, the encrypted values of the evaluation sequence are multiplicatively blinded, before the (encrypted) evaluation sequence is provided to the entity (e.g. the user device or more precisely the program evaluation function (client) inside the user device) that is responsible for evaluating the evaluation sequence.

The sequence of encrypted values $[[c_{ji}]]$ for each node (the encrypted evaluation information) may be evaluated by the evaluation function residing in the user device. Evaluation may for example be realized by checking whether one of the $1+S$ encrypted values is zero or not. In embodiments of the invention, the encrypted values of the evaluation sequence are first decrypted, preferably by the client (e.g. with reference to FIG. 2A, preferably the pre-processing function 219 of the secure module) of the user device responsibly for the evaluation of the evaluation sequence(s), before the predetermined number is (can be) detected. Thus the evaluation of the evaluation sequence may comprise a further step of decrypting the encrypted values/numbers (it should be noted that the two terms "values" and "numbers" have been interchangeably used throughout the application).

However, it also possible, in some embodiments, to evaluate the evaluation sequence in the encrypted domain. For instance with an additive homomorphic cryptosystem, such as DGK, the DGK comparison protocol may be used for the evaluation, which under certain conditions, may be executed in the encrypted domain. In such situation no prior decryption of the evaluation sequence to plain text is required. An example of such condition may be that a DGK-encrypted value $[[c_{ji}]]$ contains a zero exactly when $[[c_{ji}]]^v=1 \bmod N$, where v is a 160-bit DGK parameter. The advantage of embodiments wherein the decryption step is omitted, may be that these save a computationally expensive full decryption to $c_{ji}$. Depending on the outcome, the next node is selected using the node information (e.g. the node indices). This step may be repeated until one of the end-label indices has been reached. Based on the encrypted end-labels and the determined end-label index an encrypted end-label may be determined that represents the output of the evaluation of the program (step 418). This encrypted end-label may be blinded and sent to the software delivery application for decryption (step 420) in a similar way as described with reference to FIG. 3.

The implementation described above allows the evaluation function to walk through the decision tree from the root to one of the leaves without learning the semantics decision tree. The user does not learn the commercially sensitive program parameters, the type of comparison (larger than or smaller than) at each node, and which user attributes are needed at each node.

In some embodiments, the sensitive program parameters are not the thresholds (e.g. in case of a ECG classification the thresholds are all zero), but the matrix elements of a matrix B that is use to transform the personal data. In those cases, the matrix elements may be sent by the software provisioning application to the network application in encrypted form using the public key of the user (similar the thresholds as described with reference to FIG. 3).

The matrix multiplication however requires an additional secure multiplication protocol between network application and the client comprising the following steps:

The network application may blind the encrypted matrix [B] with a random matrix R and send the blinded encrypted matrix [B+R] to the client;

The client may decrypt the blinded matrix, compute $y'=(B+R)f^c$ and send [y'] to the network application;

The network application may compute the user attribute vector $[y]=[y']^*[f^c]^{-R} \bmod N$;

For the classification, the signs of values of the user attributes $y_j$ are determined and used to classy an ECG by means of a binary decision tree as e.g. depicted in FIG. 1D. The comparison operation for each node is computed in the encrypted domain in a similar way as described above and the outcome of each comparison is embedded in a sequence of numbers.

Figures 6A, 6B:
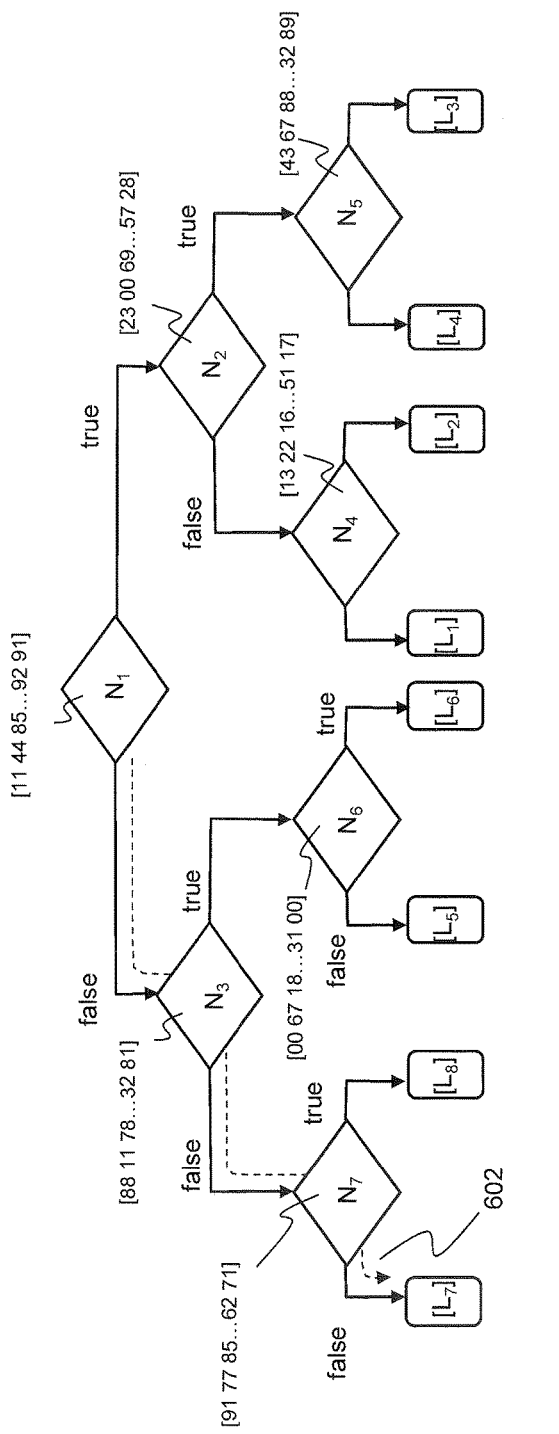
FIGS. 6A and 6B depict an example of a secure evaluation of a linear branching program according to an embodiment of the invention.

FIG. 6A depicts a schematic of the evaluation of a set of evaluation sequences associated with a linear branching program according to an embodiment of the invention. The set of evaluation sequences may be determined in a similar way as described with reference to FIG. 2-4. An evaluation function associated with a client on a user device may start the evaluation process by evaluating the sequence of values associated with the root node. The evaluation function may use an decision rule in order to determine a binary value false or true. In an embodiment, the outcome of the evaluation may be "true" if the sequence numbers in an evaluation sequence comprises a predetermined value, e.g. a zero, and "false" if the sequence does not comprise that predetermined value, or the other way around. The binary decision rule in the program information may then use this binary value in order to determine the next node, in particular the next sequence of values associated with a node, that next to be evaluated. This process may be repeated so that a path 602 to an end-label is determined.

The table in FIG. 6B depicts the information that is used by the evaluation function of the client. This information may be stored as a data structure in the memory of the user device. The data structures may comprise one or more entries. It may comprise one or more node indices wherein each node index may be associated with a sequence of values that needs to be evaluated by the evaluation function and a binary decision rule determining a pointer to a next decision node or an end-label (if the end has been reached). For example, the binary decision rule may point to a first node index if the outcome of the evaluation of the sequence of values is false and a second node index if the outcome of the evaluation of the sequence of values is true.

Hence, the client may evaluate the decision tree (as depicted in FIG. 1B) by evaluating sets of values associated with the nodes and determine the index of an encrypted end-label representing the output of the linear branching program using a set of user attributes as input to the program. This way, the client may determine the end-label without any interaction with the network application and without leaking any commercially valuable information on the program to the user and without leaking any information on the privacy sensitive user input (the user attributes) to the provider of the application server.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. The embodiment was chosen and described in order to best explain the principles of the invention and the practical application, and to enable others of ordinary skill in the art to understand the invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims.

What is claimed is:

1. Computer-implemented method for securely evaluating at least part of a linear branching program, said program having a binary decision tree structure comprising one or more decision nodes and two or more end-label nodes, wherein a decision node is associated with a comparison operation between a user attribute and a threshold value, said method comprising:

a processor in a secure server executing computer readable program code for transforming at least part of the comparison operations associated with said one or more decision node into one or more encrypted evaluation sequences on the basis of a first additive homomorphic cryptosystem, wherein an evaluation sequence of a decision node comprises a sequence of numbers in which an outcome of the comparison operation of a decision node is embedded, said processor in said secure server further executing computer readable program code for forming one or more encrypted comparison operations by combining one or more user attributes and one or more threshold values in the encrypted domain using one or more homomorphic computations; and a processor in a user device executing computer readable program code for evaluating said one or more evaluation sequences, said evaluating including detecting the presence of a predetermined number, preferably a zero, in a first evaluation sequence of a first node and determining a second decision node for evaluation or an index of an end-label on the basis of the detection of said predetermined number;

wherein said computer readable program code for transforming at least part of said comparison operations further comprises:

linking an encrypted user attribute $[v_j]$ to a node index $\alpha_j$ in order to form an indexed encrypted user attribute;

combining the indexed encrypted user attribute $[v_{\alpha j}]$ with its associated encrypted threshold value $[t_j]$ and a random blinding value $[b_j]$ into an encrypted blinded node value $[v_{\alpha j}-t_j+b_j]$ on the basis of one or more homomorphic computations;

comparing said blinded node value $[v_{\alpha j}-t_j+b_j]$ with a blinding value $b_j$ in the encrypted domain;

embedding the outcome of said comparison in an evaluation sequence.

2. Method according to claim 1 further comprising:

a receiver of said secure server receiving one or more encrypted user attributes from a user device; and a receiver of said secure server receiving one or more encrypted threshold values, one or more node indices and/or one or more node comparison parameters from a software delivery server, wherein a node index is configured to link an user attribute to a threshold value for the decision node and wherein a node comparison parameter indicates the type of comparison operation of a node and wherein user attributes and said threshold values are encrypted using a second additive homomorphic cryptosystem.

3. Method according to claim 1, wherein executing computer readable program code for evaluating said one or more evaluation sequences further comprises:

using a decision rule for selecting a further decision node of said program on the basis of the outcome of said comparison operation;

finishing said evaluation when an end-label, preferably an index of an end-label, is determined.

4. Method according to claim 1 further comprising:

if an index of an end-label is determined, said user device requesting said end-label from a software provisioning server or said secure server.

5. Method according to claim 1, wherein said one or more user attributes are associated with classification values $y_i$, preferably said classification values being part of a classification vector $y=B \, f^c$, wherein the matrix B comprises commercially sensitive knowledge data obtained through a set of training ECGs and wherein $f^c$ represents a composite feature vector; or, wherein said user attributes are associated with one or more sensor parameters that are obtained from a hardware based sensor.

6. Computer program product comprising software code portions configured for, when run in the memory of a computer, executing the method steps according to claim 1.

7. Method according to claim 1 wherein comparing said encrypted blinded node value with a blinding value in the encrypted domain includes:
decrypting said encrypted blinded node value $[v_{\alpha j}-t_j+b_j]$ into a blinded node value;
determining a bitwise encrypted blinded node value $[[v_{\alpha j}-t_j+b_j]]_B$ and a bitwise encrypted blinding value $[[b_j]]_B$ on the basis of said first additive homomorphic cryptosystem.

8. Method according to claim 7 further comprising:
using the DGK comparison protocol for comparing said bitwise encrypted blinded node value $[[v_{\alpha j}-t_j+b_j]]_B$ and said bitwise encrypted blinding value $[[b_j]]_B$ and for generating an evaluation sequence that is associated with said comparison.

9. A secure server for enabling secure evaluation of a linear branching program, said program having a binary decision tree structure comprising one or more decision nodes and two or more end-labels, wherein a decision node is associated with a comparison operation between a user attribute and a threshold value, the server comprising:
a non-transitory computer readable storage medium having computer readable program code embodied therewith, and a processor coupled to the computer readable storage medium, wherein responsive to executing the first computer readable program code, the processor is configured to perform executable operations comprising:
transforming at least part of the comparison operations associated with said one or more decision nodes into one or more encrypted evaluation sequences on the basis of an additive homomorphic cryptosystem, wherein an evaluation sequence of a decision node comprises a sequence of numbers in which the outcome of the comparison operation of a node is embedded;
said processor in said secure server further executing computer readable program code for forming one or more encrypted comparison operations by combining one or more user attributes and one or more threshold values in the encrypted domain using one or more homomorphic computations;
wherein said computer readable program code for transforming at least part of said comparison operations further comprises:
linking an encrypted user attribute $[v_j]$ to a node index $\alpha_j$ in order to form an indexed encrypted user attribute;
combining the indexed encrypted user attribute $[v_{\alpha j}]$ with its associated encrypted threshold value $[t_j]$ and a random blinding value $[b_j]$ into an encrypted blinded node value $[v_{\alpha j}-t_j+b_j]$ on the basis of one or more homomorphic computations;
comparing said blinded node value $[v_{\alpha j}-t_j+b_j]$ with a blinding value $b_j$ in the encrypted domain;
embedding the outcome of said comparison in an evaluation sequence.

10. A secure server according to claim 9 wherein said executable operations further comprise:
receiving one or more encrypted user attributes from said user device; and, receiving one or more encrypted threshold values, one or more node indices and/or one or more node comparison parameters from a software delivery server,
wherein a node index is configured to link for a decision node an user attribute to a threshold value and wherein a node comparison parameter indicates the type of comparison operation of a node and wherein user attributes and said threshold values are encrypted using a second additive homomorphic cryptosystem, preferably the Pallier cryptosystem.

11. A user device for enabling secure evaluation of a linear branching program, said program having a binary decision tree structure comprising one or more decision nodes and two or more end-labels, wherein a decision node is associated with a comparison operation between a user attribute and a threshold value, said user device comprising:
a non-transitory computer readable storage medium having at least part of a transformed linear branching program embodied therewith, wherein at least part of the comparison operations associated with said one or more decision nodes of said stored linear branching program are transformed into one or more encrypted evaluation sequences on the basis of an additive homomorphic cryptosystem, wherein an evaluation sequence of a decision node comprises a sequence of numbers in which the outcome of the comparison operation of a node is embedded; and,
a non-transitory computer readable storage medium having computer readable program code embodied therewith, and a processor coupled to the computer readable storage medium, wherein responsive to executing the computer readable program code, the processor is configured to perform executable operations comprising:
evaluating said one or more evaluation sequences, said evaluating including detecting the presence of a predetermined number, preferably a zero, in a first evaluation sequence of a first node and determining a second decision node for evaluation or an index of an end-label on the basis the detection of said predetermined number;
wherein said processor is further configured to perform, prior to said evaluating operation, the additional executable operations of
determining a bitwise encrypted blinded node value $[[v_{\alpha j}-t_j+b_j]]_B$ on the basis of said additive homomorphic cryptosystem
providing via a transmitter at said device, said bitwise encrypted blinded node value $[[v_{\alpha j}-t_j+b_j]]_B$ to said secure server.

12. A user device according to claim 11 wherein said executable operations further comprise:
using a decision rule for selecting a further decision node of said program on the basis of the outcome of said comparison operation; and,
finishing said evaluation when an index of an end-label is determined.

13. A device comprising a non-transitory computer readable storage medium having computer readable program code embodied therewith, and a processor coupled to the computer readable storage medium, wherein responsive to executing the computer readable program code, the processor is configured to perform executable operations comprising:

providing via a transmitter at said device one or more encrypted user attributes $[v_j]$ to a secure server, said user attributes being encrypted by said device on the basis of an additive homomorphic cryptosystem; said one or more encrypted user attributes $[v_j]$ being linked by said secure server to a node index $\alpha_j$ in order to form an indexed encrypted user attribute; and said indexed encrypted user attribute $[v_{\alpha j}]$ being combined with an associated encrypted threshold value $[t_j]$ and a random blinding value $[b_j]$ into an encrypted blinded node value $[v_{\alpha j}-t_j+b_j]$ on the basis of one or more homomorphic computations on the basis of said homomorphic cryptosystem;

receiving from said secure server via a receiver at said device said encrypted blinded node value $[v_{\alpha j}-t_j+b_j]$;

decrypting said encrypted blinded node value $[v_{\alpha j}-t_j+b_j]$ into a blinded node value;

wherein said processor is configured to perform the additional executable operations of determining a bitwise encrypted blinded node value $[[v_{\alpha j}-t_j+b_j]]_B$ on the basis of a further additive homomorphic cryptosystem providing via a transmitter at said device, said bitwise encrypted blinded node value $[[v_{\alpha j}-t_j+b_j]]_B$ to said secure server.

14. A device according to claim 13, wherein said additive homomorphic cryptosystem is the Pallier cryptosystem and wherein said further additive homomorphic cryptosystem is the DGK cryptosystem.

15. A device according to claim 13, wherein said processor is configured to perform the additional executable operation of providing via a transmitter at said device, said blinded node value to a user device.

16. A computer program product for enabling secure evaluation of a linear branching program when executed by a processor, said program having a binary decision tree structure comprising one or more decision nodes and two or more end-labels, wherein a decision node is associated with a comparison operation between a user attribute and a threshold value, the computer program product comprising:

a non-transitory computer readable storage medium having computer readable program code embodied therewith, the computer readable program code including executable operations comprising:

transforming at least part of the comparison operations associated with said one or more decision nodes into one or more encrypted evaluation sequences on the basis of an additive homomorphic cryptosystem, wherein an evaluation sequence of a decision node comprises a sequence of numbers in which the outcome of the comparison operation of a node is embedded; and, evaluating said one or more evaluation sequences, said evaluating including detecting the presence of a predetermine number, preferably a zero, in a first evaluation sequence of a first node and determining a second decision node for evaluation or an index of an end-label on the basis the detection of said predetermined number;

wherein the computer readable program code further includes executable operations comprising forming one or more encrypted comparison operations by combining one or more user attributes and one or more threshold values in the encrypted domain using one or more homomorphic computations;

wherein said computer readable program code for transforming at least part of said comparison operations further comprises:

linking an encrypted user attribute $[v_j]$ to a node index $\alpha_j$ in order to form an indexed encrypted user attribute;

combining the indexed encrypted user attribute $[v_{\alpha j}]$ with its associated encrypted threshold value $[t_j]$ and a random blinding value $[b_j]$ into an encrypted blinded node value $[v_{\alpha j}-t_j+b_j]$ on the basis of one or more homomorphic computations;

comparing said blinded node value $[v_{\alpha j}-t_j+b_j]$ with a blinding value $b_j$ in the encrypted domain;

embedding the outcome of said comparison in an evaluation sequence.

* * * * *